US009215708B2

United States Patent
Bhagwat

(10) Patent No.: US 9,215,708 B2
(45) Date of Patent: Dec. 15, 2015

(54) METHOD AND APPARATUS FOR MULTI-NETWORK COMMUNICATION

(71) Applicant: Marvell World Trade Ltd., St. Michael (BB)

(72) Inventor: Rajesh Shreeram Bhagwat, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 145 days.

(21) Appl. No.: 13/761,949

(22) Filed: Feb. 7, 2013

(65) Prior Publication Data

US 2014/0044106 A1 Feb. 13, 2014

Related U.S. Application Data

(60) Provisional application No. 61/596,126, filed on Feb. 7, 2012.

(51) Int. Cl.
| | |
|---|---|
| *H04J 3/00* | (2006.01) |
| *H04W 4/00* | (2009.01) |
| *H04W 72/04* | (2009.01) |
| *H04W 72/12* | (2009.01) |
| *H04W 76/02* | (2009.01) |
| *G07F 17/32* | (2006.01) |

(52) U.S. Cl.
CPC ....... *H04W 72/0446* (2013.01); *G07F 17/3223* (2013.01); *H04W 72/1215* (2013.01); *H04W 76/023* (2013.01); *H04W 76/025* (2013.01)

(58) Field of Classification Search
CPC .................................................. H04W 72/0446
USPC .......................................................... 370/336
See application file for complete search history.

(56) References Cited

U.S. PATENT DOCUMENTS

| | | | |
|---|---|---|---|
| 4,337,463 A | 6/1982 | Vangen | |
| 4,366,350 A | 12/1982 | Lee et al. | |

(Continued)

FOREIGN PATENT DOCUMENTS

| | | |
|---|---|---|
| CN | 102067689 | 5/2011 |
| EP | 1860827 | 11/2007 |

(Continued)

OTHER PUBLICATIONS

"Foreign Office Action", CN Application No. 200980122587.0, Jul. 3, 2014, 12 Pages.

(Continued)

*Primary Examiner* — Gerald Smarth

(57) ABSTRACT

The present disclosure describes techniques and apparatuses for multi-network communication. In some aspects a first packet is transmitted via a wireless interface effective to prevent a device associated with a first wireless network from transmitting data packets. The wireless interface is then configured for communication via a second wireless network for a first duration of time and a second packet is transmitted via the wireless interface. Transmission of the second packet is effective to cause a peer device associated with the second wireless network to transmit data packets during the first duration of time. The wireless interface is then configured for communication via the first wireless network for a second duration of time effective to enable reception of the data packets that the device was previously prevented from transmitting.

20 Claims, 10 Drawing Sheets

(56) References Cited

U.S. PATENT DOCUMENTS

| | | |
|---|---|---|
| 4,385,384 A | 5/1983 | Rosbury et al. |
| 4,805,215 A | 2/1989 | Miller |
| 5,347,234 A | 9/1994 | Gersbach et al. |
| 5,634,207 A | 5/1997 | Yamaji et al. |
| 5,673,291 A | 9/1997 | Dent |
| 5,708,656 A | 1/1998 | Noneman et al. |
| 5,847,616 A | 12/1998 | Ng et al. |
| 5,995,819 A | 11/1999 | Yamaji et al. |
| 6,035,210 A | 3/2000 | Endo et al. |
| 6,167,245 A | 12/2000 | Welland et al. |
| 6,285,262 B1 | 9/2001 | Kuriyama |
| 6,320,919 B1 | 11/2001 | Khayrallah et al. |
| 6,347,091 B1 | 2/2002 | Wallentin et al. |
| 6,366,622 B1 | 4/2002 | Brown et al. |
| 6,374,117 B1 | 4/2002 | Denkert et al. |
| 6,438,364 B1 | 8/2002 | Waite |
| 6,452,458 B1 | 9/2002 | Tanimoto |
| 6,509,777 B2 | 1/2003 | Razavi et al. |
| 6,519,461 B1 | 2/2003 | Andersson et al. |
| 6,535,037 B2 | 3/2003 | Maligeorgos |
| 6,553,229 B1 | 4/2003 | Dent |
| 6,640,308 B1 | 10/2003 | Keyghobad et al. |
| 6,650,195 B1 | 11/2003 | Brunn et al. |
| 6,675,328 B1 | 1/2004 | Krishnamachari et al. |
| 6,738,358 B2 | 5/2004 | Bist et al. |
| 6,741,846 B1 | 5/2004 | Welland et al. |
| 6,741,862 B2 | 5/2004 | Chung et al. |
| 6,754,189 B1 | 6/2004 | Cloutier et al. |
| 6,816,452 B1 | 11/2004 | Maehata |
| 6,816,718 B2 | 11/2004 | Yan et al. |
| 6,922,433 B2 | 7/2005 | Tamura |
| 6,934,566 B2 | 8/2005 | Kang et al. |
| 6,946,950 B1 | 9/2005 | Ueno et al. |
| 6,954,708 B2 | 10/2005 | Rakshani et al. |
| 7,079,811 B2 | 7/2006 | Lee et al. |
| 7,092,428 B2 | 8/2006 | Chen et al. |
| 7,139,540 B2 | 11/2006 | Wu et al. |
| 7,139,547 B2 | 11/2006 | Wakayama et al. |
| 7,173,431 B1 | 2/2007 | Lo et al. |
| 7,174,488 B1 | 2/2007 | Chu |
| 7,206,840 B2 | 4/2007 | Choi et al. |
| 7,212,798 B1 | 5/2007 | Adams et al. |
| 7,239,882 B1 | 7/2007 | Cook |
| 7,257,095 B2 | 8/2007 | Liu |
| 7,286,009 B2 | 10/2007 | Andersen et al. |
| 7,298,183 B2 | 11/2007 | Mirzaei et al. |
| 7,310,023 B2 | 12/2007 | Cha et al. |
| 7,319,849 B2 | 1/2008 | Womac |
| 7,342,895 B2 | 3/2008 | Serpa et al. |
| 7,355,416 B1 | 4/2008 | Darshan |
| 7,377,441 B2 | 5/2008 | Wiklof et al. |
| 7,395,040 B2 | 7/2008 | Behzad |
| 7,403,018 B1 | 7/2008 | Lo et al. |
| 7,433,658 B1 | 10/2008 | Shirvani-Mahdavi et al. |
| 7,463,592 B2 | 12/2008 | Poncini et al. |
| 7,529,548 B2 | 5/2009 | Sebastian |
| 7,564,826 B2 | 7/2009 | Sherman et al. |
| 7,595,768 B2 | 9/2009 | Li et al. |
| 7,599,671 B2 | 10/2009 | Kopikare et al. |
| 7,616,935 B2 | 11/2009 | Fernandez-Corbaton et al. |
| 7,626,966 B1 | 12/2009 | Ruiter et al. |
| 7,627,025 B2 | 12/2009 | Wang et al. |
| 7,627,026 B2 | 12/2009 | Wang et al. |
| 7,636,388 B2 | 12/2009 | Wang et al. |
| 7,656,205 B2 | 2/2010 | Chen et al. |
| 7,659,003 B2 | 2/2010 | Aoki et al. |
| 7,664,085 B2 | 2/2010 | Waxman |
| 7,672,645 B2 | 3/2010 | Kilpatrick et al. |
| 7,689,190 B2 | 3/2010 | Kerth et al. |
| 7,711,004 B2 | 5/2010 | Xu |
| 7,717,342 B2 | 5/2010 | Wang |
| 7,725,118 B2 | 5/2010 | Yang et al. |
| 7,734,253 B2 | 6/2010 | Chen et al. |
| 7,777,624 B2 | 8/2010 | Wu et al. |
| 7,826,411 B2 | 11/2010 | Gonikberg et al. |
| 7,844,222 B2 * | 11/2010 | Grushkevich ............... 455/41.2 |
| 7,849,333 B2 | 12/2010 | Schindler |
| 7,876,786 B2 | 1/2011 | Bahl et al. |
| 7,881,746 B2 * | 2/2011 | Desai ........................ 455/552.1 |
| 7,898,948 B2 | 3/2011 | DiGirolamo et al. |
| 7,936,714 B1 | 5/2011 | Karr et al. |
| 7,957,340 B2 | 6/2011 | Choi et al. |
| 7,966,036 B2 | 6/2011 | Kojima |
| 7,983,216 B2 | 7/2011 | Iyer et al. |
| 7,995,544 B2 | 8/2011 | Benveniste |
| 8,000,715 B2 | 8/2011 | Melpignano et al. |
| 8,014,329 B2 | 9/2011 | Gong |
| 8,045,922 B2 | 10/2011 | Sherman et al. |
| 8,046,024 B2 | 10/2011 | Sudak et al. |
| 8,060,017 B2 | 11/2011 | Schlicht et al. |
| 8,072,913 B2 | 12/2011 | Desai |
| 8,073,388 B2 * | 12/2011 | Grushkevich et al. ........ 455/41.2 |
| 8,077,652 B2 | 12/2011 | William |
| 8,078,111 B2 | 12/2011 | Jovicic et al. |
| 8,081,038 B2 | 12/2011 | Lee et al. |
| 8,085,737 B2 | 12/2011 | Zhu |
| 8,103,224 B1 | 1/2012 | Faravash et al. |
| 8,107,391 B2 | 1/2012 | Wu et al. |
| 8,121,144 B2 | 2/2012 | Bitran |
| 8,126,502 B2 | 2/2012 | Trainin |
| 8,139,670 B1 | 3/2012 | Son et al. |
| 8,140,075 B2 | 3/2012 | Watanabe |
| 8,149,715 B1 | 4/2012 | Goel |
| 8,150,328 B2 | 4/2012 | Chaudhri et al. |
| 8,159,928 B2 | 4/2012 | Gorokhov et al. |
| 8,165,102 B1 | 4/2012 | Vleugels et al. |
| 8,170,002 B2 | 5/2012 | Wentink |
| 8,170,546 B2 | 5/2012 | Bennett |
| 8,189,506 B2 | 5/2012 | Kneckt et al. |
| 8,189,526 B2 | 5/2012 | Hsu et al. |
| 8,204,015 B2 | 6/2012 | Chaudhri et al. |
| 8,219,142 B2 | 7/2012 | Khairmode et al. |
| 8,229,087 B2 | 7/2012 | Sumioka et al. |
| 8,254,296 B1 | 8/2012 | Lambert |
| 8,256,681 B2 | 9/2012 | Wang |
| 8,274,894 B2 | 9/2012 | Kneckt et al. |
| 8,275,314 B1 | 9/2012 | Lin |
| 8,310,967 B1 | 11/2012 | Goel |
| 8,315,564 B2 | 11/2012 | Banerjea |
| 8,340,034 B1 | 12/2012 | Lee |
| 8,364,188 B2 | 1/2013 | Srinivasan et al. |
| 8,369,782 B1 | 2/2013 | Lin et al. |
| 8,442,434 B2 * | 5/2013 | Grushkevich et al. ........ 455/41.2 |
| 8,451,776 B2 | 5/2013 | Dayal et al. |
| 8,472,427 B1 | 6/2013 | Wheeler et al. |
| 8,472,968 B1 | 6/2013 | Kim |
| 8,483,190 B2 * | 7/2013 | Donovan .................... 370/338 |
| 8,493,966 B2 | 7/2013 | Bendelac |
| 8,493,992 B2 | 7/2013 | Sella et al. |
| 8,496,181 B2 | 7/2013 | Wang |
| 8,526,348 B2 | 9/2013 | Desai |
| 8,532,041 B1 | 9/2013 | Lambert et al. |
| 8,537,798 B2 | 9/2013 | Tsfati et al. |
| 8,537,799 B2 | 9/2013 | Tsfati et al. |
| 8,553,561 B1 | 10/2013 | Chokshi et al. |
| 8,571,479 B2 | 10/2013 | Banerjea |
| 8,577,305 B1 | 11/2013 | Rossi et al. |
| 8,588,705 B1 | 11/2013 | Tsui et al. |
| 8,599,814 B1 | 12/2013 | Vleugels et al. |
| 8,600,324 B1 | 12/2013 | Cousinard et al. |
| 8,619,732 B2 | 12/2013 | Khairmode et al. |
| 8,626,067 B2 | 1/2014 | Ko et al. |
| 8,649,734 B1 | 2/2014 | Lin et al. |
| 8,654,773 B2 * | 2/2014 | Wentink et al. ............ 370/395.4 |
| 8,655,278 B2 | 2/2014 | Laroche et al. |
| 8,655,279 B2 | 2/2014 | Banerjea |
| 8,665,848 B2 | 3/2014 | Wentink |
| 8,730,927 B2 | 5/2014 | Thoukydides |
| 8,750,926 B2 | 6/2014 | Fu et al. |
| 8,767,616 B2 | 7/2014 | Choi et al. |
| 8,804,690 B1 | 8/2014 | Wheeler et al. |
| 8,805,303 B2 | 8/2014 | Koo et al. |
| 8,817,682 B1 | 8/2014 | Goel et al. |
| 8,842,618 B2 | 9/2014 | Yu et al. |

(56) References Cited

U.S. PATENT DOCUMENTS

| | | |
|---|---|---|
| 8,861,469 B1 | 10/2014 | Lee et al. |
| 8,897,706 B1 | 11/2014 | Lin et al. |
| 8,913,599 B2 | 12/2014 | Gonikberg et al. |
| 8,923,788 B1 | 12/2014 | Cousinard et al. |
| 8,983,557 B1 | 3/2015 | Sun et al. |
| 8,989,669 B2 | 3/2015 | Banerjea |
| 9,026,162 B2 | 5/2015 | Wagholikar et al. |
| 9,055,460 B1 | 6/2015 | Kim |
| 9,066,369 B1 | 6/2015 | Nemavat et al. |
| 9,125,216 B1 | 9/2015 | Choi et al. |
| 9,131,520 B1 | 9/2015 | Wheeler et al. |
| 9,148,200 B1 | 9/2015 | Tsui et al. |
| 2002/0025810 A1 | 2/2002 | Takayama et al. |
| 2002/0049854 A1 | 4/2002 | Cox et al. |
| 2002/0102941 A1 | 8/2002 | Kuiri et al. |
| 2003/0040316 A1 | 2/2003 | Stanforth et al. |
| 2003/0148750 A1 | 8/2003 | Yan et al. |
| 2003/0198200 A1 | 10/2003 | Diener et al. |
| 2004/0044489 A1 | 3/2004 | Jones et al. |
| 2004/0063403 A1 | 4/2004 | Durrant |
| 2004/0105401 A1 | 6/2004 | Lee |
| 2004/0110470 A1 | 6/2004 | Tsien et al. |
| 2004/0119545 A1 | 6/2004 | Ogiso |
| 2004/0162106 A1 | 8/2004 | Monroe et al. |
| 2004/0192222 A1 | 9/2004 | Vaisanen et al. |
| 2004/0198297 A1 | 10/2004 | Oh et al. |
| 2004/0214575 A1 | 10/2004 | Jovanovic |
| 2004/0233881 A1 | 11/2004 | Kang et al. |
| 2004/0259589 A1 | 12/2004 | Bahl et al. |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0038876 A1 | 2/2005 | Chaudhuri |
| 2005/0058151 A1 | 3/2005 | Yeh |
| 2005/0064840 A1 | 3/2005 | Heydari et al. |
| 2005/0090218 A1 | 4/2005 | Ishida et al. |
| 2005/0120119 A1 | 6/2005 | Bhanu et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0206554 A1 | 9/2005 | Yamaura |
| 2005/0215197 A1 | 9/2005 | Chen et al. |
| 2005/0250528 A1 | 11/2005 | Song et al. |
| 2005/0254423 A1 | 11/2005 | Berghoff |
| 2005/0266806 A1 | 12/2005 | Soe et al. |
| 2005/0281278 A1 | 12/2005 | Black et al. |
| 2006/0007863 A1 | 1/2006 | Naghian |
| 2006/0049880 A1 | 3/2006 | Rein et al. |
| 2006/0063509 A1 | 3/2006 | Pincu et al. |
| 2006/0079232 A1 | 4/2006 | Omori et al. |
| 2006/0114044 A1 | 6/2006 | Mintchev et al. |
| 2006/0120338 A1 | 6/2006 | Hwang et al. |
| 2006/0128308 A1 | 6/2006 | Michael et al. |
| 2006/0128347 A1 | 6/2006 | Piriyapoksombut et al. |
| 2006/0189359 A1 | 8/2006 | Kammer et al. |
| 2006/0199565 A1 | 9/2006 | Ammirata |
| 2006/0200862 A1 | 9/2006 | Olson et al. |
| 2006/0214706 A1 | 9/2006 | Temple |
| 2006/0215601 A1 | 9/2006 | Vleugels et al. |
| 2006/0223474 A1 | 10/2006 | Yoshizaki et al. |
| 2006/0239443 A1 | 10/2006 | Oxford et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |
| 2006/0281404 A1 | 12/2006 | Lee et al. |
| 2006/0282541 A1 | 12/2006 | Hiroki |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0026810 A1 | 2/2007 | Love et al. |
| 2007/0077908 A1 | 4/2007 | Vorenkamp et al. |
| 2007/0081553 A1 | 4/2007 | Cicchetti et al. |
| 2007/0103829 A1 | 5/2007 | Darshan et al. |
| 2007/0109973 A1 | 5/2007 | Trachewsky |
| 2007/0142080 A1 | 6/2007 | Tanaka et al. |
| 2007/0173286 A1 | 7/2007 | Carter et al. |
| 2007/0178888 A1 | 8/2007 | Alfano et al. |
| 2007/0183443 A1 | 8/2007 | Won |
| 2007/0200622 A1 | 8/2007 | Filoramo et al. |
| 2007/0202814 A1 | 8/2007 | Ono et al. |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0238482 A1 | 10/2007 | Rayzman et al. |
| 2007/0242645 A1 | 10/2007 | Stephenson et al. |
| 2007/0254610 A1 | 11/2007 | Levy |
| 2007/0264959 A1 | 11/2007 | Carrez |
| 2007/0268862 A1 | 11/2007 | Singh et al. |
| 2007/0273458 A1 | 11/2007 | Pepper et al. |
| 2007/0280471 A1 | 12/2007 | Fallahi et al. |
| 2007/0286298 A1 | 12/2007 | Choi et al. |
| 2007/0297388 A1 | 12/2007 | Appaji et al. |
| 2008/0022162 A1 | 1/2008 | Qiu |
| 2008/0027033 A1 | 1/2008 | Gonda et al. |
| 2008/0045162 A1 | 2/2008 | Rofougaran et al. |
| 2008/0056201 A1 | 3/2008 | Bennett |
| 2008/0069034 A1 | 3/2008 | Buddhikot et al. |
| 2008/0076466 A1 | 3/2008 | Larsson |
| 2008/0080446 A1 | 4/2008 | Chung |
| 2008/0088373 A1 | 4/2008 | Hong et al. |
| 2008/0095058 A1 | 4/2008 | Dalmases et al. |
| 2008/0095059 A1 | 4/2008 | Chu |
| 2008/0111639 A1 | 5/2008 | Ryckaert et al. |
| 2008/0129118 A1 | 6/2008 | Diab |
| 2008/0130595 A1 | 6/2008 | Abdel-Kader |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0238679 A1 | 10/2008 | Rofougaran et al. |
| 2008/0259846 A1 | 10/2008 | Gonikberg et al. |
| 2008/0261552 A1 | 10/2008 | Chung |
| 2008/0261640 A1 | 10/2008 | Yoshida |
| 2008/0262991 A1 | 10/2008 | Kapoor et al. |
| 2008/0272818 A1 | 11/2008 | Ko |
| 2008/0279138 A1 | 11/2008 | Gonikberg et al. |
| 2008/0279162 A1 | 11/2008 | Desai |
| 2008/0279163 A1 | 11/2008 | Desai |
| 2008/0280638 A1 | 11/2008 | Malladi et al. |
| 2008/0310067 A1 | 12/2008 | Diab et al. |
| 2008/0320108 A1 | 12/2008 | Murty et al. |
| 2009/0005061 A1 | 1/2009 | Ward et al. |
| 2009/0010210 A1 | 1/2009 | Hiertz et al. |
| 2009/0030976 A1* | 1/2009 | Shukla et al. .................. 709/203 |
| 2009/0067396 A1 | 3/2009 | Fischer |
| 2009/0137206 A1 | 5/2009 | Sherman et al. |
| 2009/0143043 A1 | 6/2009 | Yoshizaki et al. |
| 2009/0147763 A1 | 6/2009 | Desai et al. |
| 2009/0163165 A1 | 6/2009 | Oomoto |
| 2009/0168686 A1 | 7/2009 | Love et al. |
| 2009/0168725 A1 | 7/2009 | Mishra |
| 2009/0170497 A1 | 7/2009 | Miao et al. |
| 2009/0175250 A1 | 7/2009 | Mathur et al. |
| 2009/0190541 A1 | 7/2009 | Abedi |
| 2009/0196210 A1 | 8/2009 | Desai |
| 2009/0202013 A1 | 8/2009 | Sebastian |
| 2009/0209288 A1 | 8/2009 | Rofougaran |
| 2009/0239471 A1 | 9/2009 | Tran et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0268652 A1 | 10/2009 | Kneckt et al. |
| 2009/0275299 A1 | 11/2009 | Buch et al. |
| 2009/0280762 A1 | 11/2009 | Park et al. |
| 2009/0285264 A1 | 11/2009 | Aldana et al. |
| 2009/0291640 A1 | 11/2009 | Bhattad et al. |
| 2009/0291690 A1 | 11/2009 | Guvenc et al. |

(56) References Cited

U.S. PATENT DOCUMENTS

| | | |
|---|---|---|
| 2009/0311961 A1 | 12/2009 | Banerjea |
| 2009/0312027 A1 | 12/2009 | Foschini et al. |
| 2009/0321056 A1 | 12/2009 | Ran et al. |
| 2009/0325591 A1 | 12/2009 | Liu et al. |
| 2010/0009675 A1 | 1/2010 | Wijting et al. |
| 2010/0011231 A1 | 1/2010 | Banerjea et al. |
| 2010/0029325 A1 | 2/2010 | Wang et al. |
| 2010/0052796 A1 | 3/2010 | Menkhoff |
| 2010/0061244 A1 | 3/2010 | Meier et al. |
| 2010/0062799 A1 | 3/2010 | Ishii et al. |
| 2010/0069112 A1 | 3/2010 | Sun et al. |
| 2010/0080319 A1 | 4/2010 | Blocher et al. |
| 2010/0082957 A1 | 4/2010 | Iwata |
| 2010/0097952 A1 | 4/2010 | McHenry et al. |
| 2010/0103867 A1 | 4/2010 | Kishiyama et al. |
| 2010/0130129 A1 | 5/2010 | Chang et al. |
| 2010/0135256 A1 | 6/2010 | Lee et al. |
| 2010/0138549 A1 | 6/2010 | Goel et al. |
| 2010/0165896 A1 | 7/2010 | Gong et al. |
| 2010/0189165 A1 | 7/2010 | Xu et al. |
| 2010/0216497 A1 | 8/2010 | Kawasaki |
| 2010/0238793 A1 | 9/2010 | Alfano et al. |
| 2010/0248734 A1 | 9/2010 | Yamazaki et al. |
| 2010/0283654 A1 | 11/2010 | Waheed et al. |
| 2010/0284355 A1 | 11/2010 | Jung et al. |
| 2010/0293293 A1 | 11/2010 | Beser |
| 2010/0303026 A1 | 12/2010 | Chaudhri et al. |
| 2010/0316027 A1 | 12/2010 | Rick et al. |
| 2010/0322213 A1 | 12/2010 | Liu et al. |
| 2011/0002226 A1 | 1/2011 | Bhatti |
| 2011/0007675 A1 | 1/2011 | Chiou et al. |
| 2011/0009074 A1 | 1/2011 | Hsu et al. |
| 2011/0021240 A1 | 1/2011 | Hiltunen et al. |
| 2011/0026488 A1 | 2/2011 | Patel et al. |
| 2011/0053522 A1 | 3/2011 | Rofougaran et al. |
| 2011/0097998 A1 | 4/2011 | Ko et al. |
| 2011/0103363 A1 | 5/2011 | Bennett |
| 2011/0116488 A1 | 5/2011 | Grandhi |
| 2011/0161697 A1 | 6/2011 | Qi et al. |
| 2011/0164538 A1 | 7/2011 | Karr et al. |
| 2011/0188391 A1 | 8/2011 | Sella et al. |
| 2011/0194519 A1 | 8/2011 | Habetha |
| 2011/0205924 A1 | 8/2011 | Gonikberg et al. |
| 2011/0274040 A1 | 11/2011 | Pani et al. |
| 2012/0020319 A1 | 1/2012 | Song et al. |
| 2012/0025921 A1 | 2/2012 | Yang et al. |
| 2012/0039176 A1 | 2/2012 | Eshan et al. |
| 2012/0087341 A1 | 4/2012 | Jang et al. |
| 2012/0099476 A1 | 4/2012 | Mahaffy |
| 2012/0115420 A1 | 5/2012 | Trainin |
| 2012/0195397 A1 | 8/2012 | Sayana et al. |
| 2012/0213162 A1 | 8/2012 | Koo et al. |
| 2012/0213208 A1 | 8/2012 | Hsu et al. |
| 2012/0244805 A1 | 9/2012 | Haikonen et al. |
| 2012/0276938 A1 | 11/2012 | Wagholikar et al. |
| 2012/0294396 A1 | 11/2012 | Desai |
| 2012/0327779 A1 | 12/2012 | Gell et al. |
| 2013/0045687 A1 | 2/2013 | Banerjea |
| 2013/0045688 A1 | 2/2013 | Banerjea |
| 2013/0057344 A1 | 3/2013 | Touzard et al. |
| 2013/0114548 A1 | 5/2013 | Banerjea |
| 2013/0130684 A1 | 5/2013 | Gomes et al. |
| 2013/0176903 A1 | 7/2013 | Bijwe |
| 2013/0217401 A1 | 8/2013 | Edge et al. |
| 2013/0225068 A1 | 8/2013 | Kiminki et al. |
| 2013/0287043 A1 | 10/2013 | Nanda et al. |
| 2013/0301420 A1 | 11/2013 | Zhang et al. |
| 2014/0003318 A1 | 1/2014 | Desai |
| 2014/0004794 A1 | 1/2014 | Contaldo et al. |
| 2014/0043966 A1 | 2/2014 | Lee et al. |
| 2014/0073251 A1 | 3/2014 | Banerjea |
| 2014/0087663 A1 | 3/2014 | Burchill et al. |
| 2014/0126552 A1 | 5/2014 | Dayal et al. |
| 2015/0237625 A1 | 8/2015 | Wagholikar et al. |

FOREIGN PATENT DOCUMENTS

| | | |
|---|---|---|
| EP | 2299642 | 3/2011 |
| EP | 2456275 | 5/2012 |
| JP | 2006174162 | 6/2006 |
| JP | 200728568 | 2/2007 |
| JP | 2007028568 | 2/2007 |
| WO | WO-0178252 | 10/2001 |
| WO | WO-02082751 | 10/2002 |
| WO | WO-02091623 | 11/2002 |
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO2008070777 | 6/2008 |
| WO | WO-2008150122 | 12/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"Non-Final Office Action", U.S. Appl. No. 12/883,054, Sep. 11, 2014, 29 pages.

"Non-Final Office Action", U.S. Appl. No. 13/622,916, Sep. 10, 2014, 10 pages.

"Non-Final Office Action", U.S. Appl. No. 14/063,972, Sep. 24, 2014, 6 pages.

"Non-Final Office Action", U.S. Appl. No. 14/082,981, Aug. 4, 2014, 6 pages.

"Notice of Allowance", U.S. Appl. No. 13/536,506, Sep. 19, 2014, 7 pages.

"Notice of Allowance", U.S. Appl. No. 14/089,515, Aug. 21, 2014, 4 pages.

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, 2012, 302 pages.

Jung, et al.,"A Power Control MAC Protocol for Ad Hoc Networks", Wireless Networks ; The Journal of Mobile Communication, Computation and Information, Kluwer Academic Publishers vol. 11, No. 1-2, Jan. 1, 2005, 12 Pages.

Jung, et al.,"A Power Control MAC Protocol for Ad Hoc Networks", In Proceedings of MOBICOM 2002, Sep. 23, 2002, pp. 36-47.

"Advisory Action", U.S. Appl. No. 12/646,721, Aug. 13, 2013, 3 pages.

"Advisory Action", U.S. Appl. No. 12/190,251, Dec. 7, 2011, 3 pages.

Andreaal.,"Analysis and Design of Injection-Locked LC Dividers for Quadrature Generation", IEEE Journal of Solid-State Circuits, vol. 39, No. 9, Sep. 2004, pp. 1425-1433.

"Draft Standard for Information Technology—Telecommunications and information exchange between systems—Local and metropolitan area networks—Specific requirements", IEEE P802.11s/D1.03, Apr. 2007, 251 pages.

"Final Office Action", U.S. Appl. No. 12/759,336, Feb. 25, 2013, 11 pages.

"Final Office Action", U.S. Appl. No. 12/358,955, Mar. 18, 2013, 12 pages.

"Final Office Action", U.S. Appl. No. 12/534,361, Feb. 29, 2012, 13 pages.

"Final Office Action", U.S. Appl. No. 12/646,802, Nov. 15, 2012, 15 pages.

"Final Office Action", U.S. Appl. No. 12/190,251, Sep. 13, 2011, 15 pages.

"Final Office Action", U.S. Appl. No. 12/646,721, Jun. 6, 2013, 16 pages.

"Final Office Action", U.S. Appl. No. 12/186,429, Oct. 13, 2011, 23 pages.

"Final Office Action", U.S. Appl. No. 12/542,845, Sep. 25, 2012, 23 pages.

(56) References Cited

OTHER PUBLICATIONS

"Final Office Action", U.S. Appl. No. 12/358,955, Feb. 17, 2012, 26 pages.
"Final Office Action", U.S. Appl. No. 12/323,292, Aug. 24, 2012, 26 pages.
"Final Office Action", U.S. Appl. No. 12/487,425, May 3, 2012, 9 pages.
"Foreign Office Action", Chinese Application No. 200980122587.0, Sep. 10, 2013, 11 Pages.
"Foreign Notice of Allowance", Japanese Application No. 2011-513586, Jul. 16, 2013, 2 pages.
"Foreign Office Action", Chinese Application No. 200980122587.0, Feb. 21, 2013, 17 pages.
"Foreign Office Action", European Patent Application No. 09789754.0, Mar. 11, 2013, 4 Pages.
"Foreign Office Action", Japanese Application No. 2011-513586, Apr. 9, 2013, 4 Pages.
"Foreign Office Action", European Patent Application No. 09789754.0, Jul. 12, 2012, 4 pages.
"Foreign Office Action", Japanese Application No. 2011-513586, Oct. 23, 2012, 7 pages.
"Foreign Office Action", EP Application No. 09789754.0, May 17, 2011, 8 pages.
"Further Higher Data Rate Extension in the 2.4 GHz Band", IEEE P802.11g/D8.2,Draft Supplement to Standard [for] Information Technology, Apr. 2003, 69 pages.
Haas, et al.,"Gossip-Based Ad Hoc Routing", IEEE/ACM Transactions on Networking, vol. 14, No. 3, Jun. 2006, pp. 479-491.
"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment", IEEE Computer Society, Oct. 14, 2010, pp. 12-18, 23, 65-68.
"Information Technology—Telecommunications and Information Exchange Between systems—Local and Metropolitan Area Networks—Specific Requirements", IEEE Standard, Aug. 1, 2005, pp. 1-60.
"Information Technology—Telecommunications and Information Exchange between Systems—Local and Metropolitan Area Networks—Specific Requirements", Part 11: Wireless LAN Medium Access Control (MAC) and Physical Layer (PHY) Specifications, IEEE Standard 802.11h-2003 (Amendment to IEEE Std 802.11-1993), Oct. 14, 2003, 80 pages.
Qiao, et al.,"Interference Analysis and Transmit Power Control in IEEE 802.11a/h Wireless LANs", IEEE / ACM Transactions on Networking, IEEE / ACM, New York, NY, US, vol. 15. No. 5, Oct. 1, 2007, 14 Pages.
"Non-Final Office Action", U.S. Appl. No. 12/167,841, Jul. 15, 2011, 10 pages.
"Non-Final Office Action", U.S. Appl. No. 12/534,361, Oct. 12, 2011, 11 pages.
"Non-Final Office Action", U.S. Appl. No. 12/190,251, Mar. 29, 2012, 11 pages.
"Non-Final Office Action", U.S. Appl. No. 13/099,169, Mar. 28, 2013, 12 pages.
"Non-Final Office Action", U.S. Appl. No. 13/429,090, Oct. 24, 2013, 13 pages.
"Non-Final Office Action", U.S. Appl. No. 12/759,336, Oct. 4, 2012, 13 pages.
"Non-Final Office Action", U.S. Appl. No. 13/479,124, Sep. 27, 2013, 14 pages.
"Non-Final Office Action", U.S. Appl. No. 12/646,721, Nov. 7, 2012, 15 pages.
"Non-Final Office Action", U.S. Appl. No. 12/646,721, May 10, 2012, 15 pages.
"Non-Final Office Action", U.S. Appl. No. 12/235,333, Jun. 28, 2011, 16 pages.
"Non-Final Office Action", U.S. Appl. No. 12/646,802, Mar. 29, 2012, 16 pages.
"Non-Final Office Action", U.S. Appl. No. 12/323,292, Dec. 21, 2011, 17 pages.
"Non-Final Office Action", U.S. Appl. No. 12/478,446, Dec. 28, 2011, 17 pages.
"Non-Final Office Action", U.S. Appl. No. 12/883,054, Nov. 22, 2013, 18 pages.
"Non-Final Office Action", U.S. Appl. No. 13/656,482, Mar. 19, 2013, 19 pages.
"Non-Final Office Action", U.S. Appl. No. 12/186,429, Apr. 25, 2011, 19 pages.
"Non-Final Office Action", U.S. Appl. No. 12/542,845, Apr. 4, 2012, 19 pages.
"Non-Final Office Action", U.S. Appl. No. 12/358,955, Sep. 6, 2011, 24 pages.
"Non-Final Office Action", U.S. Appl. No. 12/542,845, Oct. 23, 2013, 29 pages.
"Non-Final Office Action", U.S. Appl. No. 12/358,955, Aug. 20, 2012, 33 pages.
"Non-Final Office Action", U.S. Appl. No. 13/656,502, Feb. 21, 2013, 6 pages.
"Non-Final Office Action", U.S. Appl. No. 13/604,563, Apr. 5, 2013, 6 pages.
"Non-Final Office Action", U.S. Appl. No. 12/487,425, Jan. 12, 2012, 7 pages.
"Non-Final Office Action", U.S. Appl. No. 12/190,240, Jan. 6, 2012, 7 pages.
"Non-Final Office Action", U.S. Appl. No. 12/190,251, Mar. 29, 2011, 8 pages.
"Non-Final Office Action", U.S. Appl. No. 13/249,740, Mar. 26, 2013, 9 pages.
"Non-Final Office Action", U.S. Appl. No. 13/249,740, Oct. 16, 2013, 9 pages.
"Non-Final Office Action", U.S. Appl. No. 13/099,169, Oct. 4, 2013, 9 pages.
"Notice of Allowance", U.S. Appl. No. 13/656,502, Jun. 25, 2013, 11 pages.
"Notice of Allowance", U.S. Appl. No. 12/167,841, Nov. 25, 2011, 11 pages.
"Notice of Allowance", U.S. Appl. No. 12/534,361, Feb. 14, 2013, 12 pages.
"Notice of Allowance", U.S. Appl. No. 12/190,240, May 16, 2012, 4 pages.
"Notice of Allowance", U.S. Appl. No. 12/235,333, Nov. 15, 2011, 5 pages.
"Notice of Allowance", U.S. Appl. No. 13/604,563, Sep. 26, 2013, 5 pages.
"Notice of Allowance", U.S. Appl. No. 12/190,251, Oct. 4, 2012, 6 pages.
"Notice of Allowance", U.S. Appl. No. 12/478,446, Jun. 14, 2012, 6 pages.
"Notice of Allowance", U.S. Appl. No. 12/323,292, Jun. 28, 2013, 8 pages.
"Notice of Allowance", U.S. Appl. No. 12/358,955, Jul. 1, 2013, 8 pages.
"Notice of Allowance", U.S. Appl. No. 13/656,482, Sep. 3, 2013, 8 pages.
"Notice of Allowance", U.S. Appl. No. 12/759,336, May 3, 2013, 9 pages.
"Notice of Allowance", U.S. Appl. No. 12/186,429, Jun. 6, 2013, 9 pages.
"Notice of Allowance", U.S. Appl. No. 12/487,425, Jul. 26, 2013, 9 pages.
"Part 11: Wireless LAN Medium Access Control (MAC) and Physical Layer (PHY) specifications", IEEE Std 802.11b-1999/Cor 1-2001,Amendment 2: Higher-speed Physical Layer (PHY) extension in the 2.4 GHz band, Nov. 7, 2001, 23 pages.
"Part 11: Wireless LAN Medium Access Control (MAC) and Physical Layer (PHY) specifications", IEEE Std 802.11a-1999,High-speed Physical Layer in the 5 GHz Band, 1999, 91 pages.
"Part 11: Wireless LAN Medium Access Control (MAC) and Physical Layer (PHY) specifications", Information technology—Tele-

(56) References Cited

OTHER PUBLICATIONS communications and information exchange between systems—Local and metropolitan area networks—Specific requirements-,IEEE, Apr. 2003, pp. 1-69.
"PCT Search Report", Application No. PCT/US2009/046289, Oct. 29, 2009, 13 pages.
"PCT Search Report and Written Opinion", Application No. PCT/US2011/054358, Dec. 16, 2011, 13 pages.
"PCT Search Report and Written Opinion", Application No. PCT/IB2013/000390, Aug. 21, 2013, 19 Pages.
"Restriction Requirement", U.S. Appl. No. 12/167,841, May 12, 2011, 6 pages.
Tinnirello, et al.,"Revisit of RTS / CTS Exchange in High-Speed IEEE 802.11 Networks", World of Wireless Mobile and Multimedia Networks. 2005. Wowmom 2005. Sixth IEEE International Symposium on a Taormina-Giardini Naxos, Italy Jun. 13-16, 2005 Piscataway, NJ, USA,IEEE, Los Alamitos, CA, USA, Jun. 13, 2005, 10 Pages.
"Search Report", European Application No. 13169350.9, Aug. 13, 2013, 10 Pages.
"Supplemental Notice of Allowance", U.S. Appl. No. 12/759,336, Jun. 5, 2013, 2 pages.
"Supplemental Notice of Allowance", U.S. Appl. No. 12/759,336, Jun. 18, 2013, 2 pages.
"Supplemental Notice of Allowance", U.S. Appl. No. 12/186,429, Jul. 10, 2013, 2 pages.
"Supplemental Notice of Allowance", U.S. Appl. No. 12/759,336, Aug. 14, 2013, 2 pages.
"Supplemental Notice of Allowance", U.S. Appl. No. 12/323,292, Oct. 17, 2013, 2 pages.
"Supplemental Notice of Allowance", U.S. Appl. No. 12/323,292, Oct. 7, 2013, 2 pages.
"Supplemental Notice of Allowance", U.S. Appl. No. 12/358,955, Oct. 11, 2013, 3 pages.
Mujtaba "TGn Sync Proposal Technical Specification", IEEE 802.11-04/0889r6,This document presents the technical specification for the MAC and the PHY layer of the TGn Sync proposal to IEEE 802.11 TGn, May 18, 2005, pp. 1-131.
Mujtaba "TGn Sync Proposal Technical Specification", IEEE 802.11-04 / Wireless LANs, May 2005, pp. 1-131.
"Final Office Action", U.S. Appl. No. 12/883,054, Jun. 9, 2014, 22 pages.
"Foreign Office Action", EP Application No. 13169350.9, May 9, 2014, 3 Pages.
"Non-Final Office Action", U.S. Appl. No. 13/458,227, Jul. 3, 2014, 10 pages.
"Non-Final Office Action", U.S. Appl. No. 13/536,506, Apr. 25, 2014, 12 pages.
"Non-Final Office Action", U.S. Appl. No. 13/911,979, Jun. 9, 2014, 11 pages.
"Non-Final Office Action", U.S. Appl. No. 14/089,515, May 13, 2014, 9 pages.
"Notice of Allowance", U.S. Appl. No. 13/722,354, May 15, 2014, 4 pages.
"Notice of Allowance", U.S. Appl. No. 13/757,276, Jul. 8, 2014, 6 pages.
"PCT Search Report and Written Opinion", Application No. PCT/US2013/025144, Jun. 5, 2013, 10 pages.
"Foreign Office Action", CN Application No. 200980122587.0, Jan. 24, 2014, 10 Pages.
"International Search Report and Written Opinion", Application No. PCT/IB2013/001962, Feb. 6, 2014, 11 Pages.
"Notice of Allowance", U.S. Appl. No. 13/673,363, Mar. 24, 2014, 4 pages.
"Notice of Allowance", U.S. Appl. No. 13/923,949, Mar. 31, 2014, 6 pages.
"Non-Final Office Action", U.S. Appl. No. 13/673,363, Nov. 29, 2013, 12 pages.
"Non-Final Office Action", U.S. Appl. No. 13/722,354, Jan. 17, 2014, 17 pages.
"Non-Final Office Action", U.S. Appl. No. 13/911,979, Jan. 31, 2014, 19 pages.
"Supplemental Notice of Allowance", U.S. Appl. No. 13/656,482, Nov. 29, 2013, 2 pages.
"Supplemental Notice of Allowance", U.S. Appl. No. 13/656,482, Dec. 19, 2013, 2 pages.
"Non-Final Office Action", U.S. Appl. No. 13/923,949, Dec. 17, 2013, 5 pages.
"Non-Final Office Action", U.S. Appl. No. 13/757,276, Jan. 30, 2014, 9 pages.
"Final Office Action", U.S. Appl. No. 12/484,563, Apr. 24, 2012, 18 pages.
"Final Office Action", U.S. Appl. No. 12/616,454, Apr. 11, 2012, 19 pages.
"International Search Report and Written Opinion", PCT Application PCT/US2012/035597, Aug. 6, 2012, 13 pages.
"Non-Final Office Action", U.S. Appl. No. 12/484,563, Oct. 4, 2011, 13 pages.
"Non-Final Office Action", U.S. Appl. No. 12/732,036, Aug. 9, 2012, 13 pages.
"Non-Final Office Action", U.S. Appl. No. 12/616,454, Dec. 22, 2011, 8 pages.
"Notice of Allowance", U.S. Appl. No. 12/616,454, Aug. 22, 2012, 4 pages.
"Notice of Allowance", U.S. Appl. No. 12/484,563, Jul. 9, 2012, 6 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Supplemental Notice of Allowance", U.S. Appl. No. 12/716,569, Jul. 23, 2012, 2 pages.
"Corrected Notice of Allowance", U.S. Appl. No. 14/063,972, Jan. 26, 2015, 2 pages.
"Corrected Notice of Allowance", U.S. Appl. No. 14/063,972, Feb. 25, 2015, 2 pages.
"Foreign Office Action", CN application No. 200980122587.0, Dec. 3, 2014, 10 pages.
"Non-Final Office Action", U.S. Appl. No. 14/082,981, Feb. 13, 2015, 13 pages.
"Notice of Allowance", U.S. Appl. No. 12/883,054, Feb. 9, 2015, 12 pages.
"Notice of Allowance", U.S. Appl. No. 13/458,227, Jan. 2, 2015, 7 pages.
"Notice of Allowance", U.S. Appl. No. 13/622,916, Mar. 30, 2015, 4 pages.
"Notice of Allowance", U.S. Appl. No. 13/911,979, Nov. 20, 2014, 12 pages.
"Notice of Allowance", U.S. Appl. No. 14/063,972, Nov. 7, 2014, 8 pages.
"Supplemental Notice of Allowance", U.S. Appl. No. 13/757,276, Oct. 24, 2014, 2 pages.
"Foreign Board Opinion", CN Application No. 200980122587.0, Aug. 7, 2015, 13 Pages.
"Non-Final Office Action", U.S. Appl. No. 14/071,171, Sep. 1, 2015, 13 pages.
"Supplemental Notice of Allowance", U.S. Appl. No. 14/082,981, Aug. 25, 2015, 6 pages.
"Amendment 3: Enhancements for Very High Throughput in the 50 GHz Band", Sponsor IEEE 802.11 Committee of the IEEE Computer Society, IEEE P802.11ad/D5.0 (Draft Amendment Based on IEEE P802.11REVmb D10.0) (Amendment to IEEE 802.11REVmb D10.0 as amended by IEEE 802.11ae D5.0 and IEEE 802.11aa 06.0); Draft Standard for Information Technology Telecommunications and Information Exchange, Sep. 2011, 601 Pages.
"Amendment 4: TV White Spaces Operation", The Institute of Electrical and Electronics Engineers, Inc., IEEE Std P802.11af/D1.05 Draft Standard for Information Technology-Telecommunications and Information Exchange Between Systems-Local and Metropolitan area networks—Specific Requirements, Part 11: Wireless LAN Medium Access Control (MAC) and Physical Layer, Nov. 2011, 123 Pages.

(56) References Cited

OTHER PUBLICATIONS

"Amendment 5: Enhancements for Very High Throughput for Operation in Bands below 6 GHz", Prepared by the 802.11 Working Group of the 802 Committee, IEEE P802.11 ac™/D0.2 Draft STANDARD for Information Technology-IEEE P802.11ac/D0.2. Mar. 2011 Telecommunications and information exchange between systems-Local and metropolitan area networks Specific requirements Part 11: Wireless LAN Medium Access Co, Mar. 2011, 184 Pages.

"Amendment 5: Protected Management Frames", Prepared by: IEEE 802 Committee of the IEEE Computer Society, P802.11w™/D4.0 Draft Standard for Information Technology-Telecommunications and information exchange between systems-Local and metropolitan area networks-Specific requirements—Part 11: Wireless LAN Medium Access Control (MAC) and Physical Layer (PHY) spec, Nov. 2007, 63 Pages.

"Amendment 6: Medium Access Control (MAC) Security Enhancements", Prepared by the LAN/MAN Standards Committee of the IEEE Computer Society, IEEE Standard for Information Technology Telecommunications and information exchange between systems—Local and metropolitan area networks Specific requirements Part 11: Wireless LAN Medium Access Control (MAC) and Physical Layer (PHY) specifications, Jul. 23, 2004, 190 Pages.

"Amendment 6: Sub 1 GHz License Exempt Operation", 802.11 Working Group of the LAN/MAN Standards Committee of the IEEE Computer Society, IEEE P802.11ah/D1.0 Draft Standard for Information Technology—Telecommunications and Information exchange between systems Local and Metropolitan Area Networks—Specific Requirements Part 11: Wireless LAN Medium Access Control (MAC) and Physical Layer (PH, Oct. 2013, 394 Pages.

"Amendment 7: Medium Access Control (MAC) Quality of Service (QoS) Enhancements", Prepared by the LAN/MAN Standards Committee of the IEEE Computer Society, IEEE Standard for Information Technology-Telecommunications and information exchange between systems-Local and metropolitan area networks Specific requirements Part 11: Wireless Medium Access Control, Oct. 2004, 195 Pages.

"Amendment 8: IEEE 802.11 Wireless Network Management", Prepared by the LAN/MAN Standards Committee of the IEEE Computer Society, Draft Standard for Information technology Telecommunications and information exchange between systems-Local and metropolitan area networks Specific requirements-Part 11: Wireless LAN Medium Access Control (MAC) and Physical Layer (PHY) specifications, Aug. 2010, 426 Pages.

"Higher-Speed Physical Layer Extension in the 2.4 GHz Band", LAN/MAN Standards Committee of the IEEE Computer Society, IEEE Std 802.11b Supplement to Standard for Information Technology-Telecommunications and Information Exchange Between Systems-Local and Metropolitan area networks—Specific Requirements, Part 11: Wireless Lan Medium Access Control (MAC) and Physical Layer, Sep. 16, 1999, 96 Pages.

"IEEE P802.11ac (TM) / D2.0", Draft Standard for Information Technology—Telecommunications and information exchange between systems—Local and metropolitan area networks—Specific Requirements/Part 11: Wireless LAN Medium Control (MAC) and Physical Layer (PHY) specifications/Am, Jan. 2012, 359 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; Amendment 1: Radio Resource Measurement of Wireless LANs; IEEE Std 802.11k-2008, Jun. 12, 2008, 244 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.

"Non-Final Office Action", U.S. Appl. No. 13/932,797, Jul. 2, 2015, 7 pages.

"Notice of Allowance", U.S. Appl. No. 14/082,981, May 18, 2015, 7 pages.

"Notice of Allowance", U.S. Appl. No. 14/456,460, Apr. 29, 2015, 7 pages.

"Restriction Requirement", U.S. Appl. No. 14/071,171, Apr. 27, 2015, 6 pages.

"Supplemental Notice of Allowance", U.S. Appl. No. 13/622,916, May 7, 2015, 2 pages.

"Supplemental Notice of Allowance", U.S. Appl. No. 13/622,916, Jul. 10, 2015, 2 pages.

Gunman, "Multi-Rate Layered Decoder Architecture for Block LDPC Codes of the IEEE 802.11n Wireless Standard", Department of Electrical and Computer Engineering Texas A&M University, 2007, 4 Pages.

\* cited by examiner

METHOD AND APPARATUS FOR MULTI-NETWORK COMMUNICATION

CROSS REFERENCE TO RELATED APPLICATIONS

This claims priority under 35 U.S.C. §119(e) to U.S. Provisional Patent Application Ser. No. 61/596,126 filed Feb. 7, 2012, the disclosure of which is incorporated by reference herein in its entirety. This present disclosure is also related to U.S. Pat. No. 8,310,967 filed Jun. 15, 2009 and U.S. patent application Ser. No. 13/458,227 filed Apr. 27, 2012.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless networks allow users to access remote content, control presentation of media content, and/or interact with various computing and electronic devices. These functionalities are typically provided using multiple wireless networks, each of which may be configured to provide a respective functionality. Accordingly, computing or electronic devices that implement some, or all, of these functionalities are often configured to access the multiple wireless networks through which the functionalities are provided or accessed.

Computing devices configured to access multiple wireless networks are typically configured to support multiple radio modules, in which each radio module communicates according to the same and/or different wireless communication standard or protocol. For example, a computing device may include one radio module for each wireless network with which the device the device is configured to communicate. The inclusion of each additional radio module, however, increases demands on device resources, increases device power consumption, drives device complexity, and/or increases production costs of the device. Thus, computing devices configured to access multiple wireless networks using multiple radio modules are often inefficient, overly-complex, or expensive.

SUMMARY

This summary is provided to introduce subject matter that is further described below in the Detailed Description and Drawings. Accordingly, this Summary should not be considered to describe essential features nor used to limit the scope of the claimed subject matter.

A method is described for transmitting a first packet via a wireless interface of a first device effective to prevent a second device associated with a first wireless network from attempting to transmit data packets to the first device. The wireless interface is then configured for communication via a second wireless network for a first duration of time and a second packet is transmitted via the wireless interface. Transmission of the second packet is effective to cause a peer device associated with the second wireless network to transmit data packets to the first device during the first duration of time. The wireless interface is then configured for communication via the first wireless network for a second duration of time effective to enable the first device to receive the data packets that were previously prevented from being transmitted from the second device to the first device.

Another method is described for determining an amount of time consumed by a first data transaction with a device associated with a first wireless network. It is then determined, based on this amount of time, whether second data transaction can be completed during a communication interval. If the second data transaction can be completed prior to the communication interval ending, the second data transaction is initiated. Alternately, if the second data transaction cannot be completed prior to the communication interval ending, the second data transaction is delayed until a next communication interval. At the end of the communication interval, communication with a peer device of a second wireless network is enabled by switching to the second wireless network until a start of the next communication interval.

A system is described that includes a network manager to transmit a first packet via a wireless interface of the system effective to prevent a device associated with a first wireless network from attempting to transmit data packets. The network manager then configures the wireless interface for communication via a second wireless network for a first duration of time and transmits a second packet via the wireless interface. Transmission of the second packet is effective to cause a peer device associated with the second wireless network to transmit data packets to the system during the first duration of time. The network manager then configures the wireless interface for communication via the first wireless the first wireless network for a second duration of time effective to enable the system to receive the data packets that were previously prevented from being transmitted from the device to the system.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional techniques for communicating over multiple wireless networks often rely on configuring a device to support multiple radio modules for each of the respective wireless networks. Computing or electronic devices that support multiple wireless radios, however, are often inefficient, overly-complex, and/or expensive to produce. This disclosure describes apparatuses and techniques for multi-network communication that enable a device to maintain links over multiple wireless networks with one radio module (e.g., wireless interface). A device may transmit a first packet via a wireless interface effective to prevent another device associated with a first wireless network from transmitting data packets. The wireless interface can then be configured for communication via a second wireless network for a duration of time and a second packet is transmitted via the wireless interface. Transmission of the second packet is effective to cause one or more peer devices associated with the second wireless network to transmit other data packets during the duration of time. The wireless interface can then be configured for communication via the first wireless network for another duration of time effective to enable reception of the data packets from the other device. By so doing, communication links over both wireless networks can be maintained without substantially limiting bandwidth of either communication link or employing additional radio modules.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
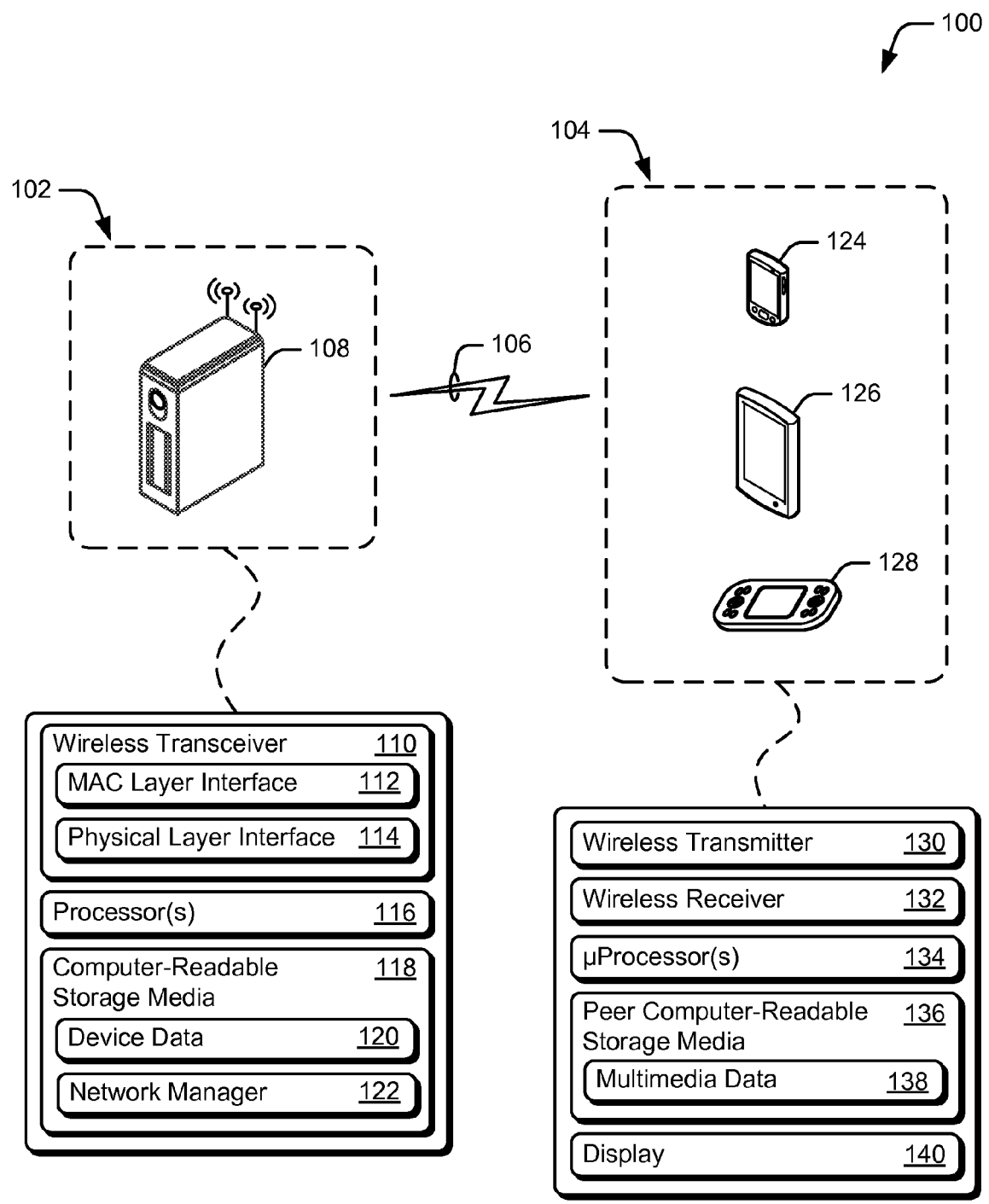
FIG. 1 illustrates an operating environment having wireless devices in accordance with one or more aspects.

FIG. 1 illustrates an example operating environment 100 having a wireless host device 102 (host device 102) and wireless peer devices 104 (peer devices 104), each of which are wireless-network-enabled and capable of communicating data, packets, and/or frames over communication link 106. Communication link 106 may be any suitable type of wireless communication link or any suitable combination thereof. For example, communication link 106 may be implemented in whole or part as a wireless local-area-network (WLAN), ad-hoc WLAN, infrastructure WLAN, wireless mesh network, wireless personal-area-network (WPAN), wireless wide-area-network (WWAN), or short-range wireless network. Communication link 106 may also implement various peer-to-peer communication protocols such as wireless fidelity (WiFi) direct link or a peer-link, as described below.

In this particular example, host device 102 includes entertainment console 108, which is typically associated with a monitor or a display (not shown) to enable interaction with a user interface. Entertainment console 108 enables user interaction with multimedia content, such as movies, music, video games, social networks, streaming content, web applications, and the like. Although not shown, other configurations of host devices 102 are also contemplated such as a desktop computer, server, media server, laptop computer, media personal computer (PC), mobile-internet device (MID), gaming console, internet-enabled televisions, and so on.

Host device 102 includes wireless transceiver 110 that provides a wireless interface to handle various communication protocols, such as IEEE 802.11, Bluetooth™, and others mentioned above and elsewhere herein. Wireless transceiver 110 may be configured to implement any suitable type of wireless interface, such as a WLAN, cellular, or Bluetooth™ interface, or a combination thereof. Alternately or additionally, wireless transceiver 110 may be further configured to operate in one or more communication modes, such as infrastructure, peer-to-peer, mesh, peer-link, and the like.

Although shown as a single transceiver, wireless transceiver 110 may be implemented as a separate transmitter and receiver (not shown), and may be hardware combined with or separate from firmware or software. Wireless transceiver 110 communicates data via media access control (MAC) layer interface 112 and physical (PHY) layer interface 114, either of which may be hardware combined with or separate from firmware or software. Data of host device 102 is packetized, framed, and/or addressed for communication via MAC layer interface 112. The packetized or framed data is then transmitted over a wireless medium by PHY layer interface 114.

Host device 102 also includes processor(s) 116 and computer-readable storage media 118 (CRM 118). Processor 116 may be a single core or multiple core processor composed of a variety of materials, such as silicon, polysilicon, high-K dielectric, copper, and so on. CRM 118 may include any suitable memory or storage device such as random-access memory (RAM), static RAM (SRAM), dynamic RAM (DRAM), non-volatile RAM (NVRAM), read-only memory (ROM), or Flash memory useful to store device data 120 of host device 102. Device data 120 includes user data, multimedia data, applications and/or an operating system of the host device 102, which are executable by processor 116 to enable user interaction with host device 102.

CRM 118 also includes network manager 122, which, in one implementation, is embodied on CRM 118 (as shown). Alternately or additionally, network manager 122 may be implemented in whole or part as hardware logic or circuitry integrated with or separate from other components of host device 102 (e.g. wireless transceiver 110). In at least some aspects, network manager 122 configures wireless transceiver for communication over multiple wireless networks enabling host device 102 to communicate with respective devices associated with each of these wireless networks. How network manager 122 is implemented and used varies and is described below.

Peer devices 104 include smart-phone 124, tablet computer 126, and multimedia controller 128 (e.g., gaming controller or remote control). Other implementations of peer device 104 contemplated include various peripherals and/or input devices, such as motion-sensitive controllers, optically-sensitive controllers, camera arrays, motion sensors, interactive human-input devices, and the like. Peer devices 104 can receive user input via any suitable sensor, such as hardware buttons (e.g., tactile or dome switches), capacitive sensors, touch screens, micro-electromechanical systems (MEMS) sensors, and the like. Each peer device 104 may also render, decode, and/or present multimedia data received from host device 102 via communication link 106.

Each of peer devices 104 includes a wireless transmitter 130 and a wireless receiver 132 for providing a wireless interface to communicate via various protocols or wireless networks, such as IEEE 802.11 or Bluetooth™. Peer devices 104 operate in one or more communication modes, such as infrastructure, peer-to-peer, mesh, peer-link, and the like. Transmitter 130 and receiver 132 may be separate (shown) or combined (not shown) and may be hardware combined with or separate from firmware or software.

Peer devices 104 also include microprocessor(s) 134 (μprocessor 134), peer computer-readable storage media 136 (peer CRM 136), and multimedia data 138, which, in one implementation, is embodied on peer CRM 136. Peer CRM 136 may include any suitable memory or storage device, such as random-access memory (RAM), read-only memory (ROM), or Flash memory useful to store multimedia data 138 or other applications, firmware, and/or operating systems of the peer device 104. Peer devices 104 may also include display 140 for presenting multimedia data 138 to users. Alternately or additionally, peer devices 104 include speakers, transducers, and/or vibrating motors for generating tactile or audible user feedback based on multimedia data 138. For example, multimedia controller 128 can transmit user input received via hardware buttons to entertainment console 108 and present multimedia data 138 received from entertainment console 108 to users via display 140.

Figure 2:
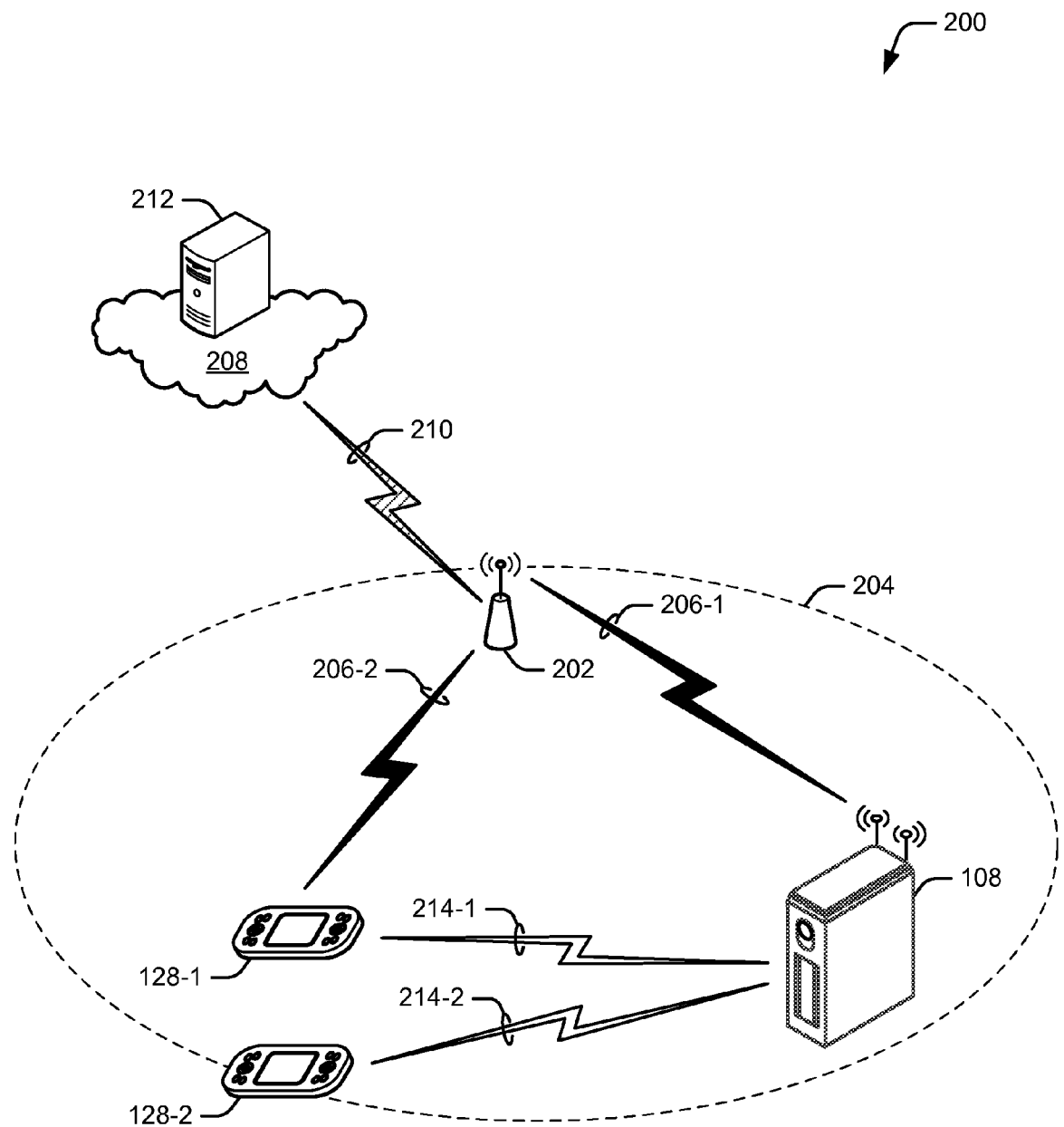
FIG. 2 illustrates an example of wireless devices of FIG. 1 communicating in accordance with one or more aspects.

FIG. 2 illustrates an example of device environment 200, which includes an entertainment console 108 communicating with multimedia controller 128-1, multimedia controller 128-2, and access point 202. Access point 202 manages wireless network 204, which may be configured as an infrastructure basic service set (BSS) network in compliance with the IEEE 802.11 family of standards (e.g., IEEE 802.11n or 802.11e). Wireless network 204 can operate over any suitable channel or frequency band of a given wireless protocol, such as the 2.4 GHz or 5 GHz bands as specified by IEEE 802.11. Alternately or additionally, wireless network 204 can be implemented as a Bluetooth™ pico-net or other point-to-multipoint wireless network.

Entertainment console 108 and multimedia controller 128-1 communicate with access point 202 via wireless links 206-1 and 206-2 respectively. Access point 202 manages communication within wireless network 204 and enables connectivity to an external network 208 (e.g., the Internet) via broadband link 210. Various resources and services are accessible via external network 208, such as services provided by authentication server 212. Authentication server 212 stores information useful to verify and/or authenticate devices, such as MAC addresses, certificates, serial numbers, and the like. In some cases, interaction with authentication server 212 enables a host device 102 to discover and/or configure peer devices 104 for communication without user involvement.

In this particular example, entertainment console 108 communicates with multimedia controllers 128-1 and 128-2 via wireless peer-links 214-1 and 214-2 respectively. Wireless peer-links 214-1 and 214-2 (peer-links 214-1 and 214-2) may be implemented using any suitable peer-to-peer wireless network, such as an ad-hoc network, mesh network, independent BSS, Wifi Direct, or proprietary peer-to-peer protocols. Peer-links 214-1 and 214-2 can be implemented over any suitable channel or frequency band of a given wireless protocol, such as the 2.4 GHz or 5 GHz bands as specified by IEEE 802.11. Peer-link communication enables direct communication between peer devices (e.g., host device 102 and peer device 104), reducing overhead and latency associated with communicating through a router or gateway (e.g., access point 202). Peer-links may be authenticated or established based on device proximity, manual user input, security/pin codes, an authenticating entity, or a combination thereof.

In some aspects, host device 102 actively communicates over both wireless network 204 and a peer-link network comprising one or more peer-links. In such aspects, bandwidth of available to host device 102 can be shared between wireless network 204 and the peer-links. By way of example, network manager 122 can configure wireless transceiver 110 to communicate over wireless network 204 for a duration of time and then configure wireless transceiver 110 to communicate via peer-links 214-1 and/or 214-2 for another duration of time effectively implementing communicative time sharing. In at least some instances, time sharing wireless transceiver 110 between different networks or communication modes enables host device 102 to maintain communication links over multiple wireless networks. Additional and alternate ways in which network manager 122 is implemented and used vary and are described below.

Figure 3:
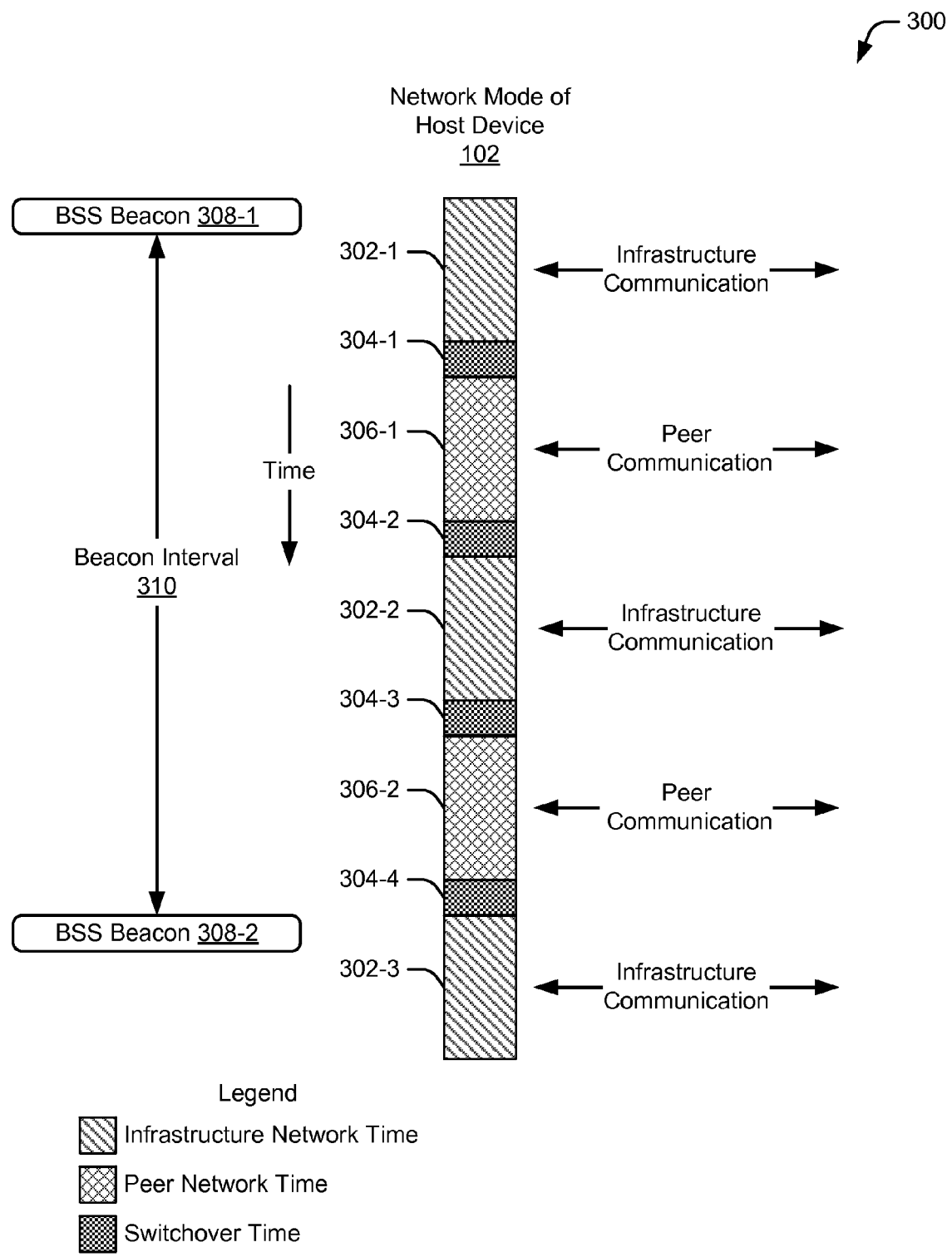
FIG. 3 illustrates an example timeline of multi-network communication in accordance with one or more aspects.

FIG. 3 illustrates an example timeline of multi-network communication in accordance with one or more aspects at 300. Generally, the timeline illustrates a communicative time-sharing schedule of host device 102, including infrastructure communication time slices 302 (infrastructure time slices 302), switchover time slices 304, and peer-link communication time slices 306 (peer-link time slices 306). These respective time slices may also be referred to as communication intervals, communication periods, time slots, and the like. Although shown as approximately equal durations of time, the infrastructure time slices 302 and peer-link time slices 306 may have different respective durations (e.g., 3-10 milliseconds). Alternately or additionally, the time slices may be altered to improve and/or maintain communications over either or both of the wireless networks.

Generally, the time slices are synchronous and follow a configurable periodic pattern. In a peer-link network, host device 102 functions as a master to which the peer devices 104 synchronize. For example, host device 102 can transmit a presence frame, time stamp, or other information that enables peer devices 104 to determine and/or synchronize with schedule for peer-link communication. Communications of wireless network 204 are managed by access point 202, which broadcasts BSS beacons 308-1 and 308-2 (BSS beacons 308) to coordinate communications. The BSS beacons are broadcast by access point 202 periodically at beacon interval 310. To maintain communication with access point 202, host device 102 receives, responds to, and/or communicates based on these BSS beacons. Accordingly, host device 102 can advance or delay peer-link time slices such that transmissions of BSS beacons 308 coincide with respective infrastructure time slices 302 (shown).

BSS beacons 308 also include a traffic indication map (TIM) that indicates status of data to be transmitted to host device 102 during a current beacon interval. In some aspects, host device 102 processes a TIM received from access point 202 and configures an allocation of time slices based on the status of data to be transmitted by access point 202. By way of example, assume a TIM of BSS beacon 308-1 indicates that no data is buffered, a data transaction is complete, or that the buffered data will be transmitted during a subsequent beacon interval. Host device 102 can reallocate the remainder of infrastructure time slice 302-1 and all of infrastructure time slice 302-2 as peer-link time slices (not shown) to increase bandwidth of the peer-link network.

Techniques for Multi-Network Communication

The following discussion describes techniques for multi-network communication. These techniques can be implemented using the previously described environments or entities, such as network manager 122 of FIG. 1 embodied on a host device 102. These techniques include methods illustrated in FIGS. 4, 6, and 8, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of device environment 200 of FIG. 2 by way of example. Such reference is not to be taken as limited to operating environment 100 but rather as illustrative of one of a variety of examples.

Figure 4:
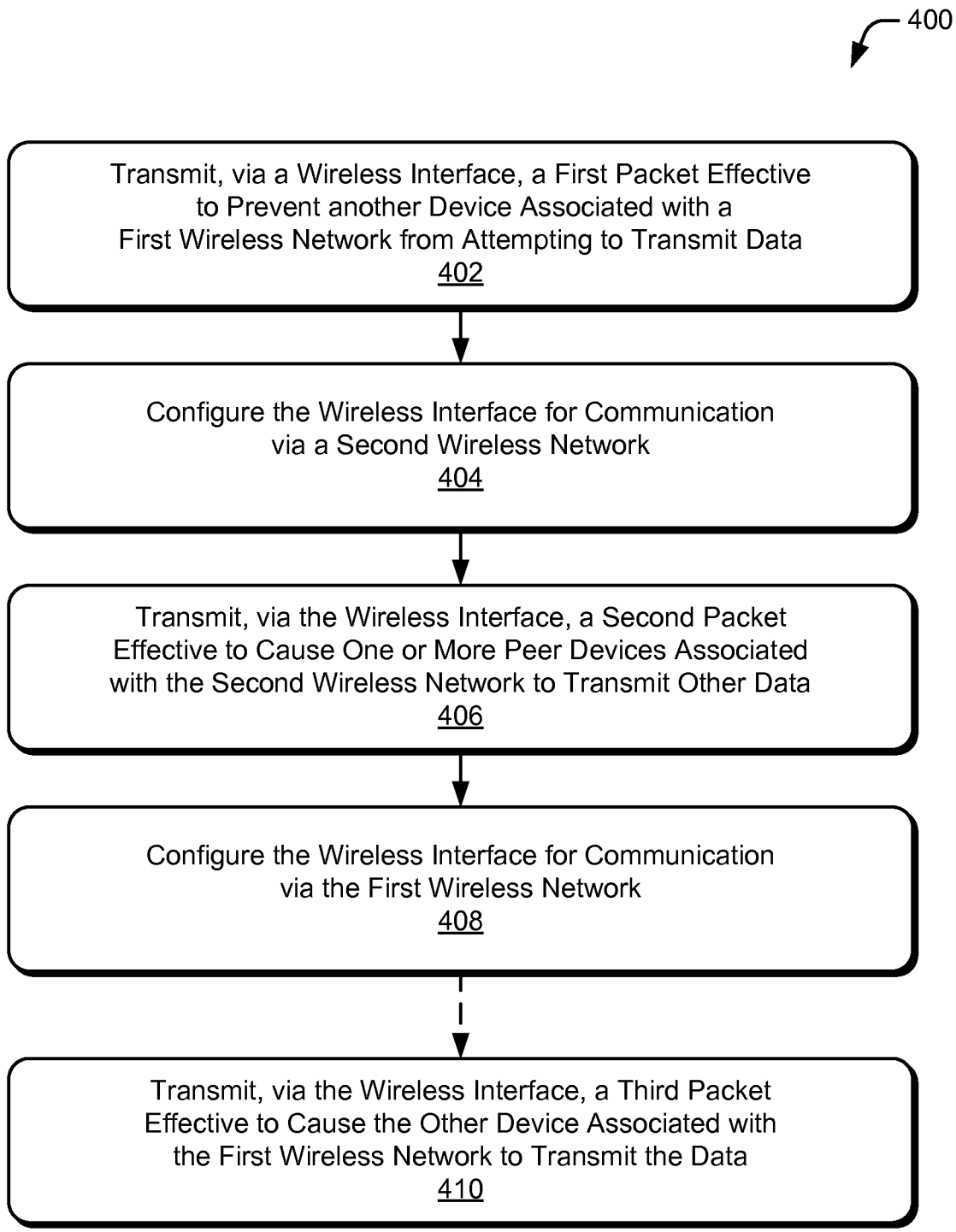
FIG. 4 illustrates a method of configuring a wireless interface for multi-network communication.

FIG. 4 depicts a method 400 of configuring a wireless interface for multi-network communication, including operations performed by network manager 122 of FIG. 1.

At 402, a first packet is transmitted via a wireless interface of a device effective to prevent another device from attempting to transmit data packets to the device. The wireless interface of the device may be implemented using a single MAC and single PHY interface (or component). The other device is associated with a first wireless network over which the wireless interface is configured to communicate, such as a WLAN BSS. In some cases, the first packet is a primitive IEEE 802.11 frame indicating the device is in, or entering, a power save mode, such as a NULL frame with a power-mode/save bit set equal to zero (e.g., PM=0). In other cases, the first packet indicates an amount or duration of time during which the other device is prevented from transmitting data, such as a clear-to-send (CTS) or CTS-to-self frame.

The first packet may be transmitted during a communication interval or time slice of a communicative schedule for a wireless interface, such as an infrastructure time slice 302. In some cases, the first packet can be transmitted proximate an end of the communication interval or time slice. In the context of device environment 200, entertainment console 108 communicates over wireless network 204 during infrastructure time slices 302-1, 302-2, and 302-3. Accordingly, network manager 122 causes wireless transceiver to transmit the first packet proximate an end of each of these time slices to prevent access point 202 from attempting to communicate during respective subsequent peer-link time slices.

Figure 5:
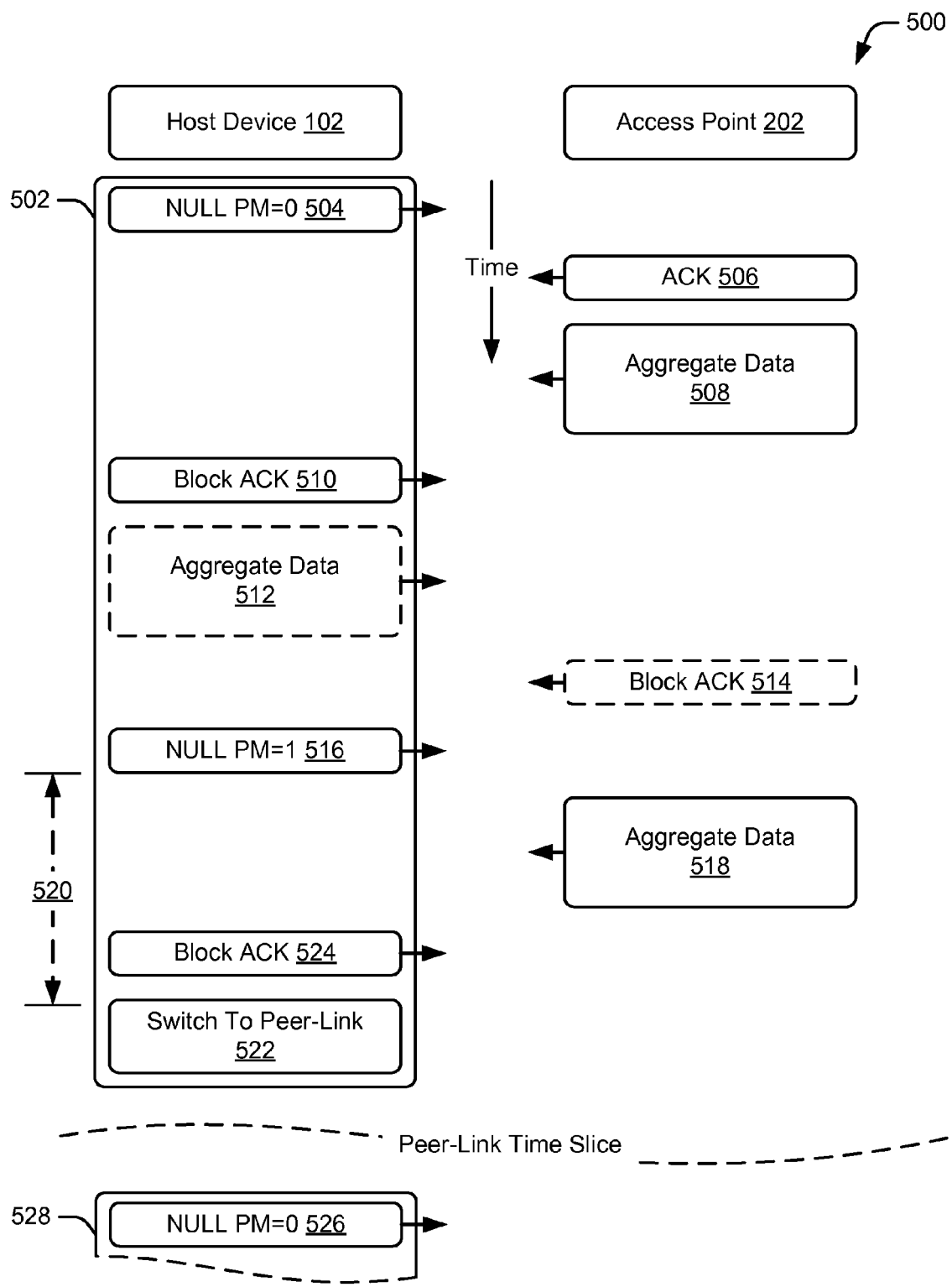
FIG. 5 illustrates an example timeline of infrastructure communication in accordance with one or more aspects.

By way of example, consider FIG. 5, which illustrates example timeline 500 of communication between a host device 102 and access point 202, including an example infrastructure time slice 502 (e.g., infrastructure time slice 302-1). At a start of infrastructure time slice 502, an indication is transmitted to access point 202 effective to notify access point 202 that host device 102 is available for communication. In some cases, the indication is a NULL frame having a power-mode bit set to 0 (PM=0) that indicates host device 102 is not in a power-save mode. In this particular example, network manager 122 causes transmission of null frame 504 to access point 202. Access point 202 acknowledges the indication with acknowledgement 506 (ACK 506) and transmits aggregate data packets 508 (aggregate data 508) to host device 102. Aggregate data 508 may be one or more packets of data buffered by access point 202 while host device 102 appears to be in a power-save or sleep state. The receipt of aggregate data 508 is then acknowledged by host device 102 with block acknowledgement 510.

After receiving aggregate data, host device 102 then transmits outbound aggregate data packets 512 (aggregate data 512) to access point 202 before infrastructure time slice 502 ends. Accordingly, access point 202 acknowledges receipt of aggregate data 512 by access point with block acknowledgement 514 (block ACK 514). To end infrastructure time slice 502, host device 102 transmits an indication that host device 102 will not be available for further communication. In some cases, the indication is a NULL frame having a power-mode bit set to 1 (PM=1), which indicates the host device 102 is entering a power-save mode. With reference to act 402 of method 400, network manager 122 causes transmission of null frame 516 to access point 202, notifying access point 202 that host device 102 is entering a power-save or sleep state. Transmission of this null frame is effective to prevent access point 202 from transmitting additional data to host device 102, which appears to be in a power save or sleep mode.

In some cases, however, transmission of null frame 516 is not sufficient to prevent access point 202 from transmitting additional aggregate data packets 518 (aggregate data 518). Aggregate data 518 may already be queued for transmission in hardware or buffers of access point 202 when null frame 516 is transmitted by, or received from, host device 102. Thus, the queued aggregate data may be transmitted by access point 202 after the null frame is transmitted by host device 102. Such a condition may be referred to as a "leaky access point." This condition is one in which data is transmitted by an access point 202 after a null frame is transmitted by host device 102. Additionally, this condition may lead to degraded communication links or link loss because the access point 202 perceives these packets, which are typically not acknowledged by a host device 102, as lost packets.

When a packet is not acknowledged by host device 102, the access point may rate adapt to a lower transmission rate in an attempt to more-robustly communicate with the host device 102. Reducing the transmission rate, however, often exacerbates the leaky access point issue. Lowering transmission rates increases an amount of time consumed by a data transmission, which results in even later arrival times for data transmitted after the null frame. Thus, after a number of iterations of transmission rate adaptation, transmission of a single data packet to host device 102 becomes difficult and access point 202 will drop the communication link.

In the context of FIG. 5, the leaky access point condition can be avoided or mitigated with the use of guard time 520. Guard time 520 permits host device 102 to receive packets from access point 202, which are transmitted after null frame 516 by preventing or delaying host device 102 from switching to peer-link mode at 522. Thus, host device 102 is able to receive aggregate data 518 during guard time 520 and respond to access point 202 with block acknowledgement 524 (block ACK 524). In some cases, a duration of guard time 520 (e.g., an amount of delay time) is configurable such that guard time 520 can be minimized based on round trip latency of previous data transactions (i.e., transactional latency). For example, if an average aggregate data transaction consumes 0.6 milliseconds of time, guard time 520 can be configured to 0.75 milliseconds to enable host device 102 to receive aggregate data transmissions from a leaky access point.

Returning to method 400, the wireless interface of the device is configured for communication via a second wireless network at 404. The wireless interface is configured to communicate via the second wireless network for a duration of time, such as a communication interval or time slice. The second wireless network may be an ad-hoc, peer-to-peer, or peer-link network. When configured for communication via the second wireless network, the device communicates the peer devices of the second wireless network. Configuring the wireless interface may include configuring a MAC or PHY component of the wireless interface. In some cases, configuring the wireless interface consumes an amount of time (e.g., switchover time), during which the device is unable to communicate over either network.

Typically, the wireless interface is configured when transitioning between two communication intervals or time slices of a communicative schedule for a wireless interface. By way example, consider again FIG. 3, which illustrates an example timeline of multi-network communication. Here, host device 102 is configured for peer-link network communication in peer-link time slices 306-1 and 306-2 during respective switchover time slices 304-1 and 304-3. In the context of device environment 200, network manager 122 configures wireless transceiver 110 of entertainment console 108 for peer-link communication at switchover time slices 304-1 and 304-3.

At 406, a second packet is transmitted via the wireless interface effective to cause peer devices associated with the second wireless network to transmit other data to the device. The second packet is typically transmitted after a settling time during which the wireless interface is set to a frequency band or channel of the second wireless network. In some cases, the second packet is a multicast packet or frame indicating that the device is a host device ready to receive data from the peer devices. The peer devices of the second wireless network then transmit, responsive to the second packet, the other data to the device. The other data may include any suitable type of data, such as is user input data transmitted by a multimedia or gaming controller. Alternately or additionally, data may be transmitted to the peer devices during the duration of time, such as multimedia data or network control information.

In the context of FIG. 3, the second packet is transmitted at a start of peer-link time slices 306, such as peer-link time slice 306-1. Here, host device 102 transmits a frame during peer-link time slice 306-1 to initiate communication with peer devices associated with the second wireless network. In the context of device environment 200, network manager 122 transmits, via wireless transceiver 110 of entertainment console 108, a multicast presence frame to multimedia controllers 128-1 and 128-2. The multimedia controllers 128-1 and 128-2 then transmit user input data to entertainment console 108 during peer-link time slice 306-1.

At 408, the wireless interface of the device is configured for communication via the first wireless network for another duration of time. During this other duration of time, the data packets queued for transmission at the other device can be received via the first wireless network. In some cases, configuring the wireless interface for communication via the first wireless network is responsive to the duration of time ending (e.g., end of a peer-link time slice). Returning to the first wireless network may be effective to maintain a communication link with the other device associated with the first wireless network.

Configuration of the wireless interface may include configuring a MAC or PHY component of the wireless interface. The wireless interface is configured to communicate via a frequency band or channel of the first wireless network. In some cases, configuring the wireless interface consumes a duration of time (e.g., switchover time), during which the device is unable to communicate over either network.

Typically, the wireless interface is configured between two communication intervals or time slices of a time-shared wireless interface. By way example, consider again FIG. 3, which illustrates an example timeline of multi-network communication. Here, host device 102 is configured for communication in infrastructure time slices 302-2 and 302-3 during respective switchover time slices 304-2 and 304-4. In the context of device environment 200, network manager 122 configures wireless transceiver 110 of entertainment console 108 for communication via wireless network 204 at switchover time slices 304-2 and 304-4.

Optionally at 410, a third data packet is transmitted via the wireless interface effective to cause the other device to transmit the data. The third packet is typically transmitted proximate a start of an infrastructure communication interval (e.g., time slice 302-2). In some cases, the third packet is a primitive IEEE 802.11 frame indicating that the device is not in, or exiting, a power-save mode, such as a NULL frame with a power-mode/save bit set equal to zero (e.g., PM=0).

The data transmitted to the device may be aggregate data stored at the other device, the transmission of which is prevented at operation 402. In the context of FIG. 5, host device 102 transmits null frame 526 at the beginning of a next infrastructure time slice 528 (e.g., infrastructure time slice 302-2). Responsive to the transmission of null frame 526, access point begins transmitting additional aggregate data. At the conclusion of 410, method 400 may then return to 402 for another iteration of multi-network communication (e.g., time slices 302-2, 304-3, and 306-2).

Figure 6:
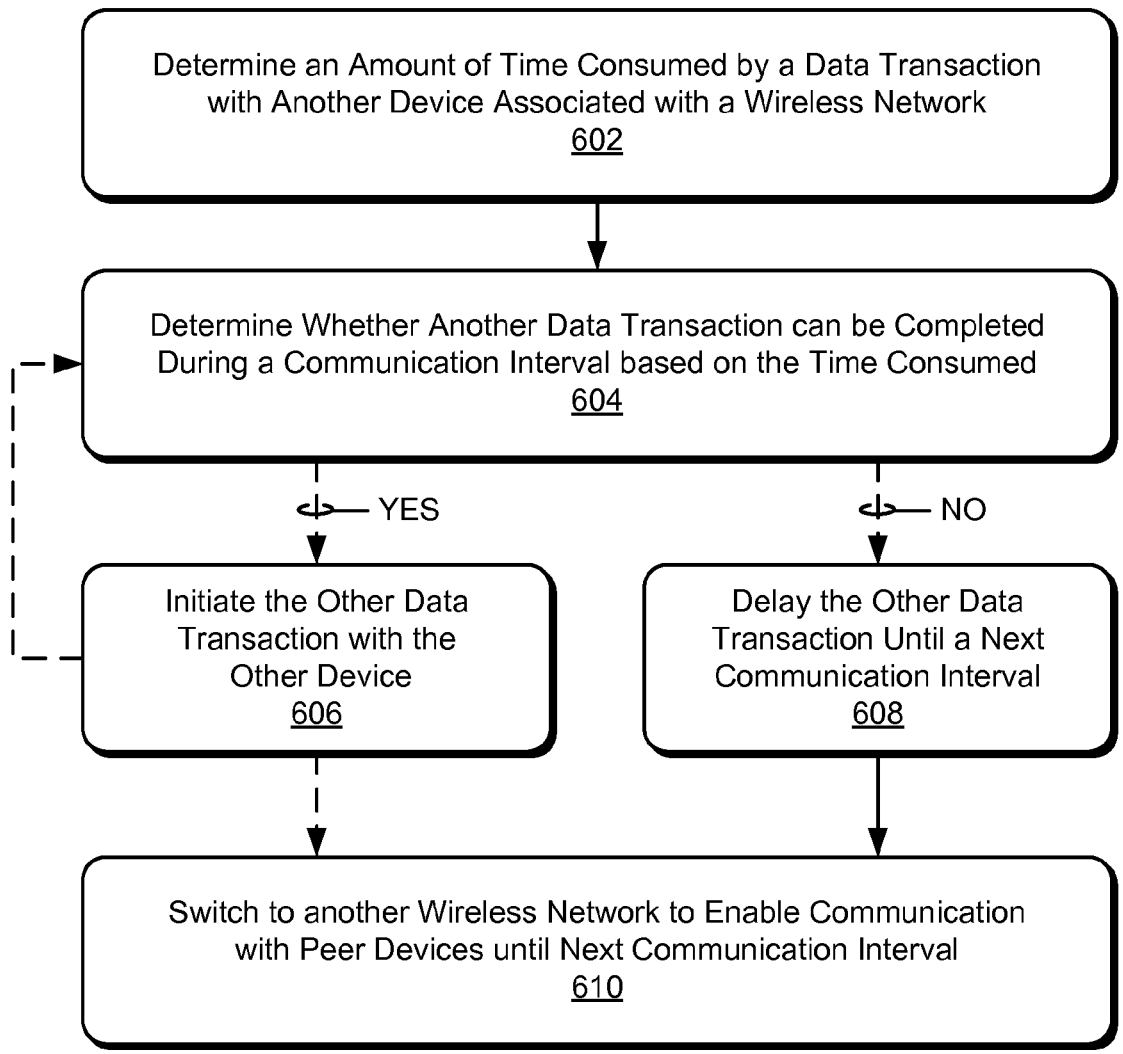
FIG. 6 illustrates a method of scheduling data transactions in accordance with one or more aspects.

FIG. 6 depicts a method 600 for scheduling data transactions, including operations performed by network manager 122 of FIG. 1.

At 602, an amount of time consumed by a data transaction with another device is determined. The data transaction can include communication of data packets and an associated acknowledgement via a wireless network. In some cases, an average data transaction time is determined over several data transactions with the other device. In such cases, an average transactional latency for the wireless network or link is determined. The wireless network over which the data transactions occur may be any suitable wireless network, such as a WLAN BSS or Bluetooth™ pico-net. Alternately or additionally, a trigger packet is transmitted to initiate one or more of the data transactions. For example, a PS poll packet transmitted to an access point is effective to cause the access point to transmit a configurable number of packets (e.g., one packet or MAC protocol data unit (MPDU)).

Figure 7:
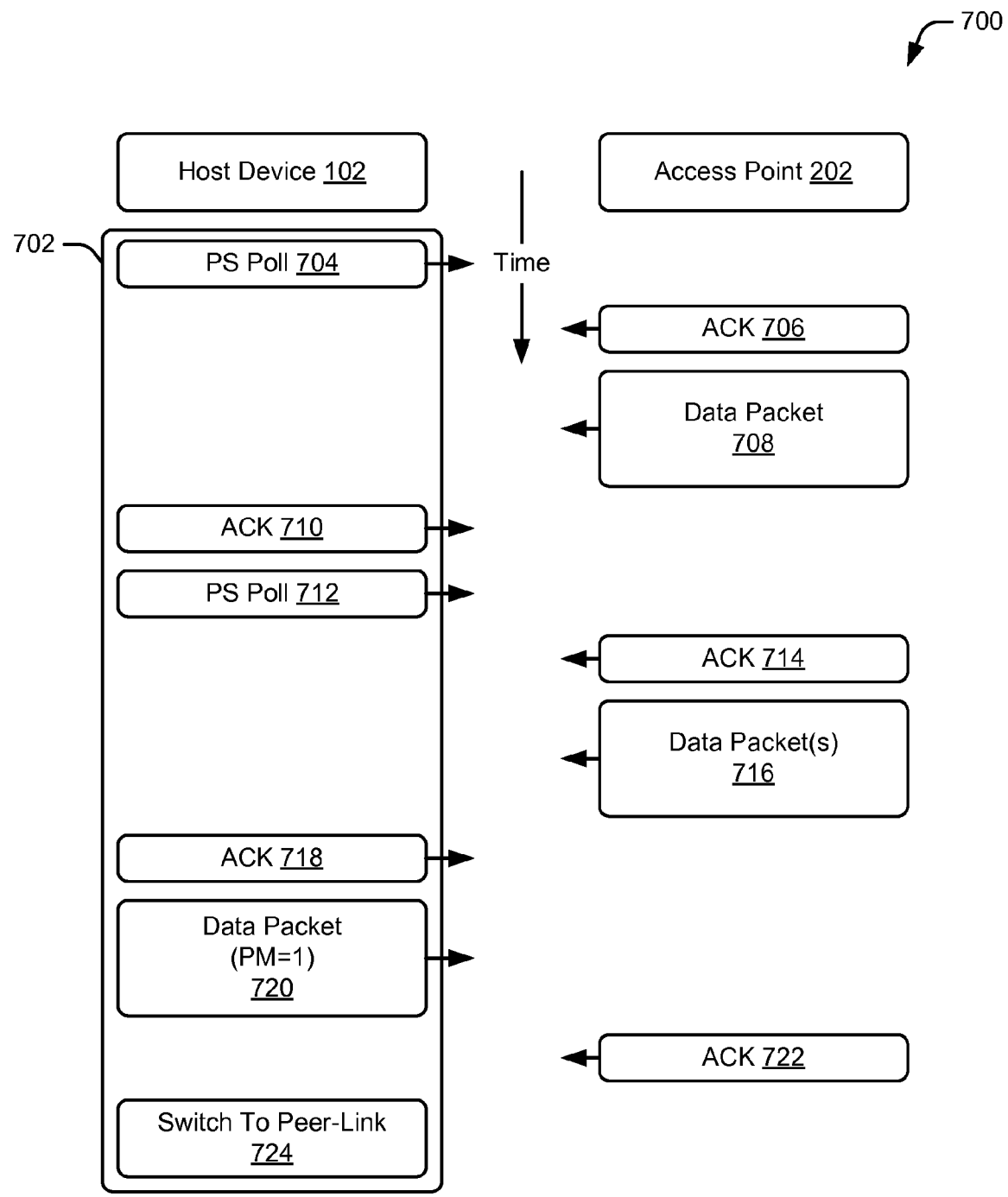
FIG. 7 illustrates another example timeline of infrastructure communication in accordance with one or more aspects.

By way of example, consider FIG. 7, which illustrates example timeline 700 of communication between host device 102 and access point 202, including an example infrastructure time slice 702 (e.g., infrastructure time slice 302-3). At a start of infrastructure time slice 702, a trigger packet is transmitted to access point 202 effective to cause access point 202 to transmit a packet to host device 102. In some cases, the trigger packet is a PS poll that indicates host device 102 is ready to receive a data packet. In this particular example, network manager 122 causes transmission of PS poll packet 704 to access point 202. Access point 202 acknowledges the PS poll packet 704 with acknowledgement 706 (ACK 706) and transmits data packet 708 to host device 102. The receipt of data packet 708 is then acknowledged by host device 102 with acknowledgement 710 (ACK 710).

From the communication of data packet 708 and ACK 710, network manager 122 can then determine an amount of time consumed by the transaction. Network manager 122 may also determine an amount of time consumed by the transaction of PS poll packet 704 and ACK 706. Alternately or additionally, network manager 122 can store a series of data transaction times and generate an average data transaction time from the series. Network manger 122 then determines an average transactional latency time for communicating with access point 202 over wireless network 204.

At 604, it is determined whether another data transaction can be completed during a communication interval based on the amount of time. In some cases, a number of data transactions that can be completed during the communication interval are determined. The communication interval may be a duration of time for which a wireless interface is configured for communication via the wireless network (e.g., infrastructure time slice). For example, network manager 122 can determine a number of packet transactions (e.g., 8 packet exchanges) that can be completed during an infrastructure time slice based on a transactional latency of a wireless link. Alternately or additionally, an average transactional latency is used when determining the number of data transactions that can be completed during the communication interval.

From operation 604, method 600 can proceed to either operation 606 or operation 608. Method 600 may proceed to operation 606 if the other data transaction can be completed before the current communication interval ends. Method 600 may proceed to operation 608 if the other data transaction cannot be completed before the current communication interval ends.

At 606, the other data transaction is initiated with the other device. Initiating the other data transaction may include sending another trigger packet to the other device, such as a PS poll packet to initiate transmission of another packet. From operation 606, method 600 may return to operation 604 to determine if additional data transactions can be conducted before the communication interval ends. Alternately, operation 606 may be repeated a particular number of times (e.g., 8 times) based on a determination that a particular number of data transactions can be completed during a communication interval or time slice. After repeating operation 606, method 600 may proceed to operation 610 once the multiple data transactions are complete. In yet other cases, method 600 may return from operation 606 to operation 602 (not shown) to update an average transactional latency time.

At 608, the other data transaction is delayed until a next communication interval. In some cases transmitting an indication to the access point that the device is in a power-save mode is effective to delay the other data transaction until the next communication interval. For example, transmitting a packet with a power-mode/save bit set equal to one (e.g., PM=1) can be effective to prevent the access point from transmitting additional data packets to the device. It should be noted, that method 600 may be performed without transmitting an indication that the device is not in a power-save mode (e.g., PM=0). Use of the PS poll mechanism permits host device 102 to receive a configurable amount of packets during each communication interval (e.g., infrastructure time slice). Although this may reduce data throughput when implementing method 600, the use of the PS poll mechanism offers more robust communication because few, if any, data packets are lost during multi-network communication.

Continuing the ongoing example, network manager determines that another data transaction of three data packets can be completed before infrastructure time slice 702 ends. To initiate another data transaction, network manager 122 transmits PS poll packet 712 to access point 202. In this case, the trigger packet transmitted to access point 202 indicates a number of packets (e.g., three) to be sent to host device 102. Access point 202 then acknowledges the PS poll packet 712 with acknowledgement 714 (ACK 714) and transmits three data packets 716 to host device 102. In other cases, data packets 716 include any suitable number of data packets, such as a maximum number of packets that can be communicated prior to the end of infrastructure time slice 702. The receipt of data packets 716 is then acknowledged by host device 102 with acknowledgement 718 (ACK 718).

After receiving data packets 716, network manager 122 determines that additional data transactions cannot be completed before infrastructure time slice 702 ends. Accordingly, network manager transmits data packet 720 to access point 202 to prevent transmission of additional data packets until a subsequent infrastructure time slice. Here, the power-mode/save bit of data packet 720 is set equal to one (e.g., PM=1) to prevent the access point from transmitting additional data packets to the device. Access point 202 acknowledges the receipt of data packet 720 with acknowledgement 722 (ACK 722).

At 610, another wireless network is switched to enabling communication with devices associated with the other wireless network. The other wireless network may be any suitable type of network, such as a peer-to-peer or peer-link network. Switching to the other network includes configuring a wireless interface of the device to communicate over the other wireless network. In some cases, the wireless interface is configured for communication over the other wireless network for a duration of time, such as a peer-link time slice.

Concluding the present example, network manager 122 configures wireless transceiver 110 of host device 102 for communication via one or more peer-links of a peer-to-peer network at 724. Wireless transceiver 110 may be configured to communicate via the peer-links for a duration of time (e.g., peer-link time slice). Once the duration of time ends, network manager 122 may configure wireless transceiver 110 for communication via the wireless network of access point 202 and receive additional data packets not received during the previous infrastructure time slice.

Data rates during infrastructure time slices may vary depending on network settings, time slice settings, and/or data packet size. By way of example, consider a wireless network configured for communication in accordance with IEEE 802.11e with an arbitration inter-frame spacing (AIFS) set to three, short inter-frame spacing (SIFS) of 16 microsecond, pre-amble of 24 microseconds. This wireless network can execute about six data transactions of 1500 bytes data per 3 millisecond infrastructure time slice, which is equivalent to about 1.2 Mbps of throughput.

Figure 8:
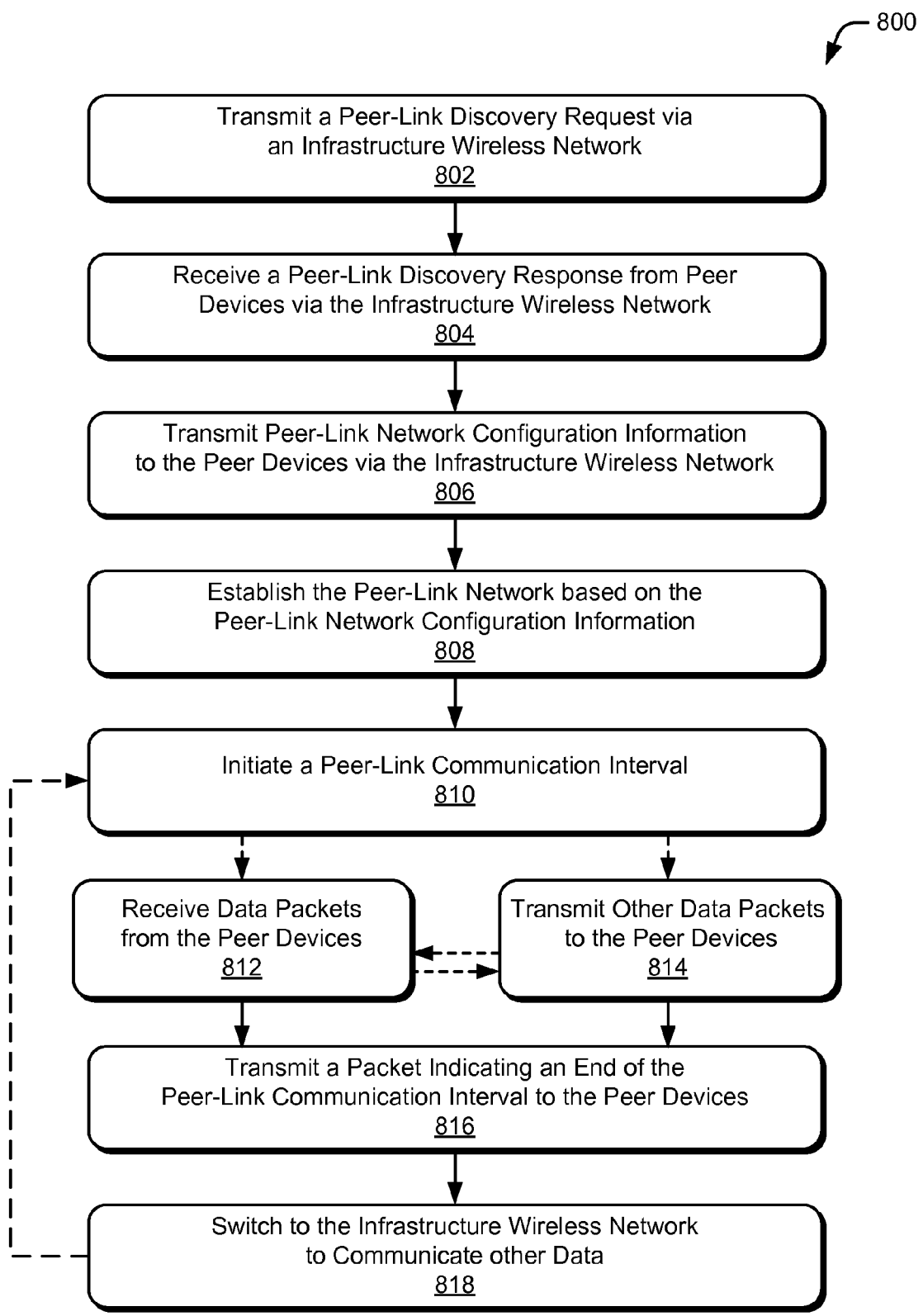
FIG. 8 illustrates a method for discovering and communicating with peer devices in accordance with one or more aspects.

FIG. 8 depicts a method 800 for discovering and communicating with peer devices, including one or more operations performed by network manager 122 of FIG. 1.

At 802, a peer-link discovery request is transmitted via an infrastructure wireless network. The peer-link discovery request queries potential peer devices for communication capabilities, such as frequency bands, channels, or data rates supported. The discovery request may be transmitted through an access point to an authentication server or forwarded by the access point to one or more peer devices. Using the access point enables messages to be proxied or tunneled between a host device and one or more peer devices.

By way of example, re-consider FIG. 2, which illustrates communications between entertainment console 108 and multimedia controllers 128-1 and 128-2. Entertainment console 108 transmits a peer-link discovery request to access point 202. From access point 202, the peer-link discovery request is forwarded to authentication server 212 or tunneled via access point 202 to multimedia controller 128-1 or multimedia controller 128-2. In some cases, forwarding the peer-link discovery request to the authentication server provides a higher level of security. The authentication server may authenticate or verify an identity of the peer devices before allowing the discovery process to proceed. In the context of the present example, the peer-link discovery request is forwarded from access point 202 to authentication server 212.

At 804, a peer-link discovery response is received from peer devices via the infrastructure wireless network. A peer-link discovery response may be received from each respective peer device that is capable of establishing a peer-link with the host device. The peer-link discovery response indicates communication capabilities of each respective peer device that responds to the peer-link discovery request, such as frequency bands, channels, or data rates supported. In some cases, the peer-link discovery response is tunneled via the access point back to the host device. In other cases, the peer-link discovery response may be received via the authentication server, which authenticates or verifies an identity of the peer device.

Continuing the ongoing example, multimedia controllers 128-1 and 128-2 transmit peer-link discovery responses to authentication server 212 via access point 202. Once authentication server 212 receivers the peer-link discovery responses, authentication server 212 identifies multimedia controllers 128-1 and 128-2 as peer devices for entertainment console 108 based on information included in the peer-link responses. This information may include any suitable identifying information, such as a MAC address of access point 202, MAC addresses of the multimedia controllers, PIN codes entered via the controllers, and the like. Once authenticated, authentication server 212 forwards the peer-link discovery responses to entertainment console 108 via access point 202. Assume here that the peer-link discovery responses indicate that multimedia controllers 128-1 and 128-2 are capable of communication via frequency bands, channels, and data rates as specified by IEEE 802.11n.

At 806, peer-link network configuration information is transmitted to the peer devices via the infrastructure network. The configuration of the peer-link network is based on the information included in the peer-link discovery responses. The network configuration information includes parameters of the peer-link network to be established with the host device, such as a service set identification (SSID), a basic SSID (BSSID), channel of operation, data rates supported, communication interval information, security keys, and so on. The peer-link network configuration information may be tunneled to the peer devices via the access point or through the authentication server.

In the context of the present example, network manager 122 of entertainment console 108 determines parameters for a peer-link network based on the peer-link discovery response received from multimedia controllers 128-1 and 128-2. In this particular example, network manager 122 configures the peer-link network for communication via channel 6 of the 2.4 GHz band in accordance with IEEE 802.11n. This peer-link network configuration information is then transmitted to multimedia controllers 128-1 and 128-2 via authentication server 212.

At 808, the peer-link is established based on the peer-link network configuration information that is transmitted to the peer devices. Establishing the peer-link network includes configuring a wireless interface of a host device for communication via the peer-link network. Continuing the ongoing example, network manager 122 configures wireless transceiver 110 of entertainment console 108 for communication via channel 6 of the 2.4 GHz band in accordance with IEEE 802.11n.

At 810, a peer-link communication interval is initiated to enable communication with the peer devices. Initiating the peer-link communication interval includes transmitting a frame or packet indicating that the host device is present. For example, a host device broadcasts a presence frame to multiple peer devices. In some cases, transmission of this frame or packet is preceded by a settling time during which the wireless interface of the host device is allowed to prepare or calibrate for communication via the peer-link network. In the context of the present example, entertainment console 108 initiates a peer-link time slice with multimedia controllers 128-1 and 128-2.

Figure 9:
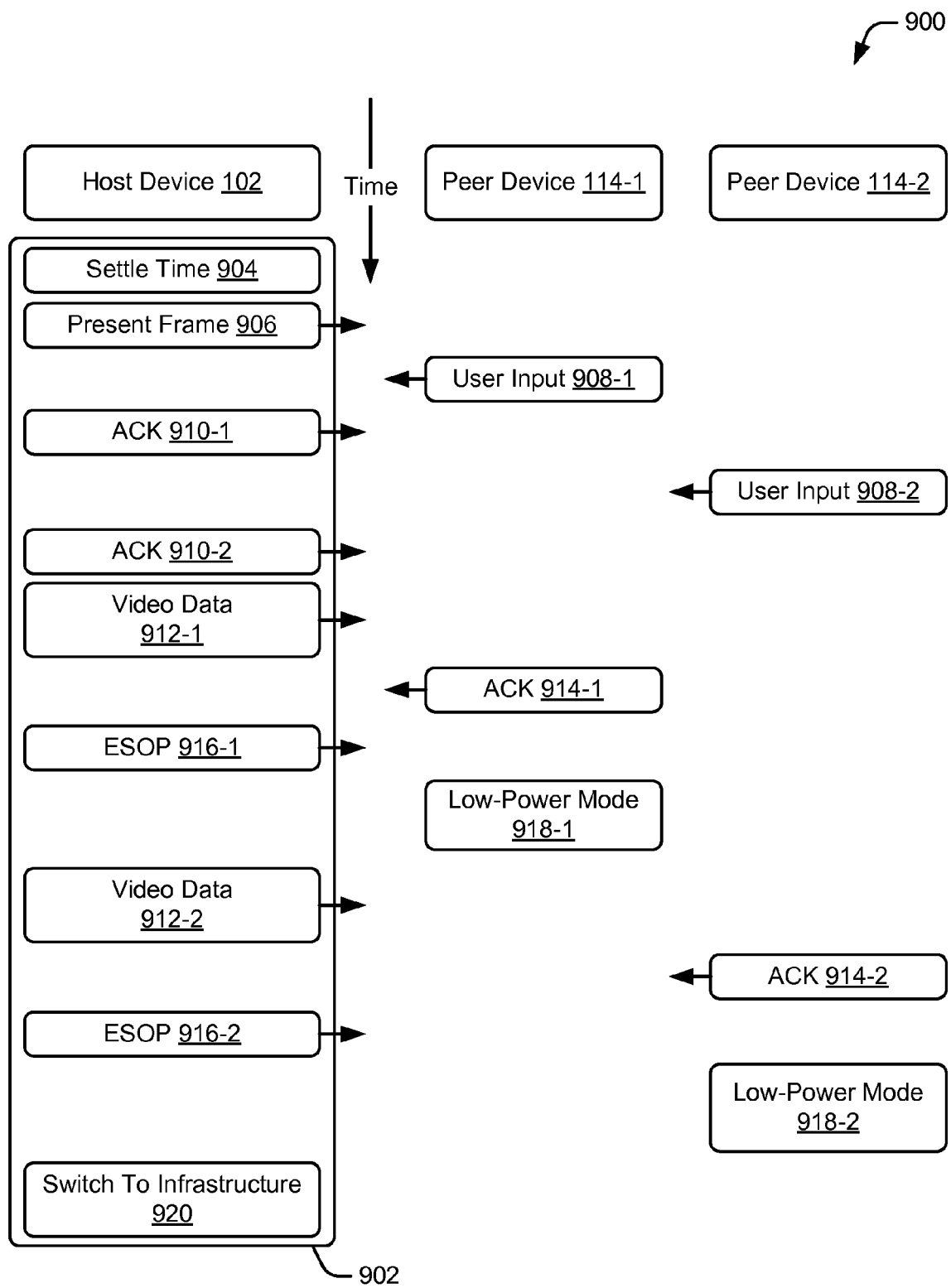
FIG. 9 illustrates an example timeline of peer-link communication in accordance with one or more aspects.

Communication during a peer-link time slice is shown in FIG. 9, which illustrates example timeline 900 of peer-link between a host device 102 (e.g., entertainment console 108) and peer devices 114-1 and 114-2 (e.g., multimedia controllers 128-1 and 128-2), including an example peer-link time slice 902 (e.g., peer-link time slice 306-1). At a start of peer-link time slice 902, a wireless transceiver 110 of host device 102 is configured for communication via a peer-link network. After waiting for an amount of settle time 904, presence frame 906 is broadcast to peer devices 114-1 and 114-2.

From operation 810, method 800 may proceed to operation 812 or operation 814. Method 800 proceeds to operation 812 if the peer devices transmit information to the host device. Method 800 proceeds to operation 814 if the host device has data packets for transmission to the peer devices. In at least some aspects, both operations 812 and 814 (in either order) are performed before proceeding to operation 816. Communication during these operations is typically coordinated using a distributed coordination function in which traffic collisions result in timing back offs and reattempts by respective actors. Thus, operation 812 or 814 may repeat until either or both operations successfully complete.

At 812, data packets are received from the peer devices via respective peer-links. In some cases, the data packets are user input for controlling playback of multimedia data, such as streaming content, music, video-on-demand, and the like. In other cases, the data packets are user input for interacting with a video game. In such cases, the data packets typically have low-latency timing requirements and are given priority over other data communicated via the peer-link(s).

In the context of FIG. 9, peer device 114-1 transmits user input packet 908-1 (user input 908-1) to host device 102, which acknowledges reception of user input 908-1 by transmitting acknowledgement 910-1 (ACK 910-1). Peer device 114-2 then transmits user input packet 908-2 (user input 908-2) to host device 102, which acknowledges reception of user input 908-2 by transmitting acknowledgement 910-2 (ACK 910-2). Host device 102 processes the user input received from peer devices 114-1 and 114-2 to update applications or programs to which the user input applies.

At 814, other data packets are transmitted to the peer devices via respective peer-links. These other packets may include multimedia data or feedback for output at by the peer devices. In some cases, the multimedia data is not peer-device specific and is broadcast to multiple peer devices concurrently (e.g., the data is multicast). In other cases, multimedia data is peer-device specific and transmitted separately to each peer device. For example, two users playing a video game may be sent separate multimedia streams (e.g., maps or character health indications) based on their respective progress within the video game.

At 816, a packet indicating an end of the peer-link communication interval is transmitted to the peer devices. Transmission of this packet can be directed to individual peer devices or multicast to multiple peer devices. For example, an end-of-service packet can be sent directly to a peer device once a determination is made that communication with the peer device is complete for the remainder of the communication interval. This enables the peer device to enter a low-power mode before the end of the communication interval effective conserve power of the peer device.

In the context of FIG. 9, assume that host device 102 has separate multimedia data queued for transmission to each of multimedia device 128-1 and 128-2. Here, host device 102 transmits video data 912-1 to peer device 114-1, which acknowledges reception of video data 912-1 with acknowledgement 914-1 (ACK 914-1). Host device 102 then determines that communication with peer device 114-1 is complete for peer-link time slice 902 and transmits end-of-service packet 916-1 (ESOP 916-1) to peer device 114-1. Responsive to reception of ESOP 916-1, peer device 114-1 enters low-power mode 918-1 for a remainder of peer-link time slice 902. This is effective to enable peer device 114-1 to conserve power until a next peer-link time slice.

Host device 102 then transmits video data 912-2 to peer device 114-2, which acknowledges reception of video data 912-2 with acknowledgement 914-2 (ACK 914-2). Host device 102 determines that communication with peer device 114-2 is complete for peer-link time slice 902 and transmits end-of-service packet 916-2 (ESOP 916-2) to peer device 114-2. Responsive to reception of ESOP 916-2, peer device 114-2 enters low-power mode 918-2 for a remainder of peer-link time slice 902. This is effective to enable peer device 114-2 to conserve power until a next peer-link time slice. As shown in FIG. 9, peer device 114-1 enters a low-power state first and may conserve more power that peer device 114-2, which remains in an active state longer. Thus, in some aspects, transmission of a first ESOP, or general order of ESOP transmissions, may be alternated between peer devices to average power conservation among the peer devices.

At 818, the infrastructure wireless network is switched to enabling communication via the infrastructure wireless network. A duration of the switch is an infrastructure communication interval during which the host device communicates via an access point with external networks, such as the Internet. For example, a host device may transmit or receive information for updating progress of streaming media or a video game. Optionally, at the end of the infrastructure communication interval, method 800 may return to operation 810 and initiate another peer-link communication interval.

Concluding the present example, network manager 122 of entertainment console 108 initiates an infrastructure time slice. In the context of FIG. 9, network manager 122 of host device 102 initiates a switch to an infrastructure time slice at 920. During the infrastructure time slice, wireless transceiver 110 is configured for communication via access point 202 to update applications or programs via the Internet.

System-on-Chip

Figure 10:
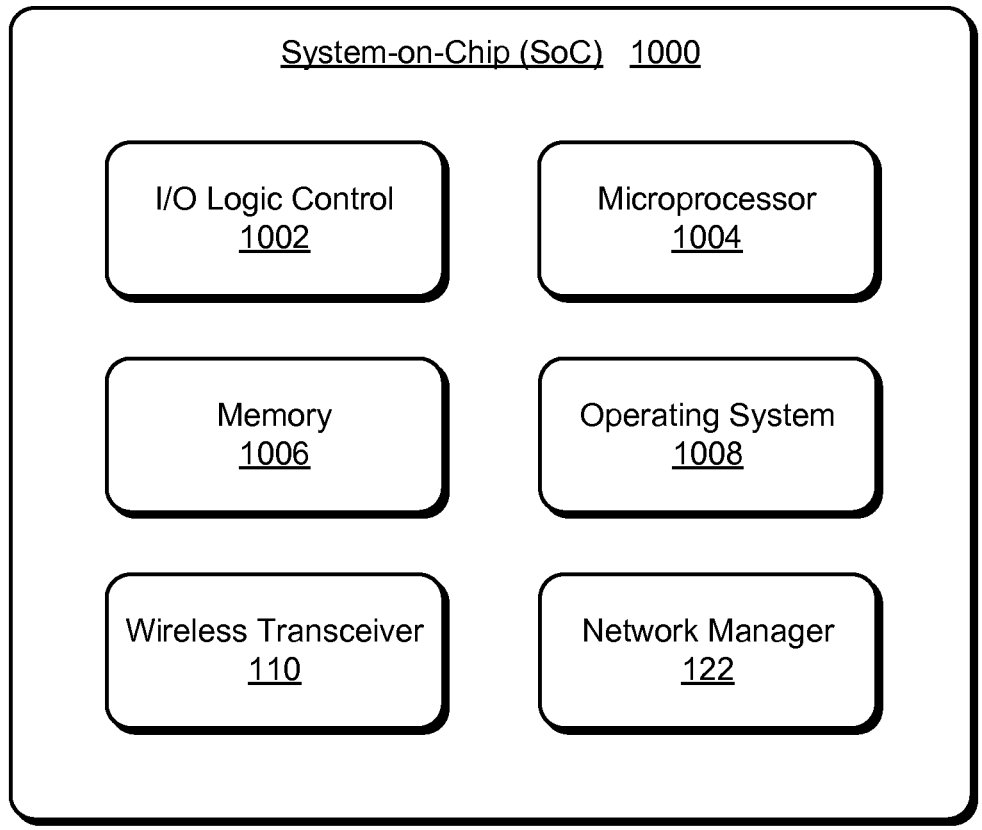
FIG. 10 illustrates a System-on-Chip (SoC) environment for implementing aspects of the techniques described herein.

FIG. 10 illustrates a System-on-Chip (SoC) 1000, which can implement various aspects of multi-network communication as described above. A SoC can be implemented in any suitable device, such as a video game console, IP enabled television, smart-phone, desktop computer, laptop computer, remote control, tablet computer, server, network-enabled printer, set-top box, wireless network card, radio module, USB dongle, and/or any other type of device that may communicate over multiple wireless networks.

SoC 1000 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 1000 can also include an integrated data bus or crossbar (not shown) that couples the various components of the SoC for data communication between the components. A wired or wireless communication device that includes SoC 1000 can also be implemented with many combinations of differing components. In some cases, these differing components may be configured to implement concepts described herein over various types of wireless connections.

In this example, SoC 1000 includes various components such as an input-output (I/O) logic control 1002 (e.g., to include electronic circuitry) and a microprocessor 1004 (e.g., any of a microcontroller or digital signal processor). SoC 1000 also includes a memory 1006, which can be any type of RAM, low-latency nonvolatile memory (e.g., Flash memory), ROM, and/or other suitable electronic data storage. SoC 1000 can also include various firmware and/or software, such as an operating system 1008, which can be computer-executable instructions maintained by memory 1006 and executed by microprocessor 1004. SoC 1000 can also include other various communication interfaces and components, communication components, other hardware, firmware, and/or software.

SoC 1000 includes wireless transceiver 110 and network manager 122 (embodied as disparate or combined components as noted above). Examples of these various components, functions, and/or entities, and their corresponding functionality, are described with reference to the respective components of the environment 100 shown in FIG. 1 and/or FIG. 2.

Network manager 122, either independently or in combination with other entities, can be implemented as computer-executable instructions maintained by memory 1006 and executed by microprocessor 1004 to implement various embodiments and/or features described herein. Network manager 122 may also be provided integral with other entities of the SoC, such as integrated with one or both of I/O logic controller 1002 or any wireless interface within, or associated with, SoC 1000. Alternatively or additionally, network manager 122 and the other components can be implemented as hardware, firmware, fixed logic circuitry, or any combination thereof that is implemented in connection with the I/O logic control 1002 and/or other signal processing and control circuits of SoC 1000.

Further aspects of the present disclosure relate to one or more of the following clauses.

A method for transmitting a first packet via a wireless interface of a first device effective to prevent a second device associated with a first wireless network from attempting to transmit data packets to the first device. The wireless interface is then configured for communication via a second wireless network for a first duration of time and a second data packet is transmitted via the wireless interface. Transmission of the second packet is effective to cause a peer device associated with the second wireless network to transmit data packets to the first device during the first duration of time. The wireless interface is then configured, responsive to the first duration of time ending, for communication via the first wireless network for a second duration of time effective to enable reception of the data packets that were previously prevented from being transmitted from the second device to the first device.

Subsequent to transmitting the first data packet, configuration of the wireless interface for communication via the second wireless network can be delayed effective to enable the first device to receive data packets transmitted by the second device after the transmission of the first data packet. An amount of time by which to delay the configuration of the wireless interface for communication via the second wireless network may be determined based on a transactional latency associated with communicating with the second device via the first wireless network.

The first wireless network may be an infrastructure wireless local-area-network (WLAN) basic service set (BSS) and the second wireless network may be a peer-to-peer network with which the peer device is associated. In some cases, the second device is configured an access point that manages the infrastructure WLAN BSS and the first data packet is a null frame that indicates to the access point that the first device is entering a power-save mode. Alternately or additionally, the first device may be a gaming console and the peer device may be an interactive human-input device. The method may be implemented in whole, or part, to authenticate or configure the interactive human-input device with the gaming console.

One or more computer-readable memory devices embodying processor-executable instructions that, responsive to execution by a processor, implement a network manager to cause a wireless interface of a first device to transmit a first packet via a first wireless network effective to prevent a second device associated with the first wireless network from attempting to transmit data packets to the first device. The network manager then configures the wireless interface for communication via a second wireless network for a first duration of time and causes the wireless interface to transmit a second packet via the second wireless network. Transmission of the second packet is effective to cause a peer device associated with the second wireless network to transmit data packets to the first device during the first duration of time. The network manager then configures, responsive to the first duration of time ending, the wireless interface of the first device for communication via the first wireless network for a second duration of time and causes the wireless interface to transmit a third packet via the first wireless network. Transmission of the third packet is effective to cause the second device to transmit, during the second duration of time, the data packets that were previously prevented from being transmitted during the first duration of time.

The network manager can also cause the wireless interface to transmit, prior to configuring the wireless interface to communicate via the first wireless network, a fourth data packet via the second wireless network effective to prevent the peer device from transmitting additional data packets during the second duration of time. The first duration of time may not be equal to the second duration of time. In some cases, the network manager determines, upon receiving a data packet via the first wireless network, that the second device will not transmit additional data packets during the second duration of time. The network manager then configures the wireless interface of the first device to communicate via the second wireless network to enable communication with the peer device during a remainder of the second duration of time.

The network manager may also align the second duration of time with a scheduled beacon transmission of the first wireless network. The network manager can also cause the wireless interface to transmit, subsequent to configuring the wireless interface to communicate via the first wireless network, a fourth data packet via the first wireless network effective to cause the second device to transmit the data packets to the first device during the second duration of time. In some cases, the network manager modifies, based on a transactional latency associated with the first wireless network, the second duration of time.

A system comprising a wireless network interface and a network manager. The wireless interface is configurable to communicate data over an infrastructure network or a peer-to-peer network. The network manager is configured to transmit a first packet via the wireless interface effective to prevent a device associated with the infrastructure network from attempting to transmit data packets to the system. The network manager can then configure the wireless interface of the system for communication via the peer-to-peer network for a first duration of time and transmit a second packet via the wireless interface. Transmission of the second packet is effective to cause a peer device associated with the peer-to-peer network to transmit data packets to the system during the first duration of time. The network manager can then configure, responsive to the first duration of time ending, the wireless interface for communication via the infrastructure network for a second duration of time. Configuring the wireless interface for communication via the infrastructure network is effective to enable the system to receive the data packets that were previously prevented from being transmitted from the device to the system.

The second packet may include information that enables the peer device to join the peer-to-peer network or to synchronize communications with the peer-to-peer network. The wireless interface may comprise a single physical layer (PHY) interface and a single media access control layer (MAC) interface. Configuring the wireless interface for communication via the first or the second wireless network can be effective to time-share the wireless interface between the first and the second wireless network. In some cases, the network manager configures, responsive to determining that the data packets will not be transmitted by the device during the second duration of time, the wireless interface of the system for communication via the peer-to-peer network for a remainder of the second duration of time. The wireless interface may comprise a wireless local-area-network (WLAN) interface or a wireless personal-area-network (WPAN) interface. Alternately or additionally, the system can be embodied as a System-on-Chip.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   transmitting, via a wireless interface of a first device, the wireless interface configured in a first mode for communication via a first wireless network, a first packet effective to prevent a second device associated with the first wireless network from attempting to transmit data packets to the first device;
   reconfiguring the wireless interface of the first device to a second mode for communication via a second wireless network for a first duration of time, the second wireless network being a type of network different from the first wireless network;
   transmitting, via the wireless interface, a second packet effective to cause a peer device associated with the second wireless network to transmit data packets to the first device during the first duration of time; and
   reconfiguring, responsive to the first duration of time ending, the wireless interface of the first device to the first mode for communication via the first wireless network for a second duration of time effective to enable reception of the data packets that were previously prevented from being transmitted from the second device to the first device.

2. The method of claim 1, further comprising and subsequent to transmitting the first data packet, delaying reconfiguring the wireless interface for communication via the second wireless network effective to enable the first device to receive data packets transmitted by the second device after the transmission of the first data packet.

3. The method of claim 2, further comprising determining, based on a transactional latency associated with communicating with the second device via the first wireless network, an amount of time by which to delay the reconfiguration of the wireless interface for communication via the second wireless network.

4. The method of claim 1, wherein the first wireless network is an infrastructure wireless local-area-network (WLAN) basic service set (BSS), and the second wireless network is a peer-to-peer network with which the peer device is associated.

5. The method of claim 4, wherein the second device is an access point that manages the infrastructure WLAN BSS, and the first data packet is a null frame that indicates to the access point that the first device is entering a power-save mode.

6. The method of claim 1, wherein the first device is a gaming console, and the peer device is an interactive human-input device.

7. The method of claim 6, wherein the acts of the method are performed at least in part to authenticate or configure the interactive human-input device with the gaming console.

8. One or more computer-readable memory devices embodying processor-executable instructions that, responsive to execution by a processor, implement a network manager to:

cause a wireless interface of a first device, the wireless interface configured in a first mode for communication via a first wireless network, to transmit, via the first wireless network, a first packet effective to prevent a second device associated with the first wireless network from attempting to transmit data packets to the first device;

reconfigure the wireless interface of the first device to a second mode for communication via a second wireless network for a first duration of time, the second wireless network being a type of network different from the first wireless network;

cause the wireless interface to transmit, via the second wireless network, a second packet effective to cause a peer device associated with the second wireless network to transmit data packets to the first device during the first duration of time;

reconfigure, responsive to the first duration of time ending, the wireless interface of the first device to the first mode for communication via the first wireless network for a second duration of time; and cause the wireless interface to transmit, via the first wireless network, a third packet effective to cause the second device to transmit, during the second duration of time, the data packets that were previously prevented from being transmitted during the first duration of time.

9. The one or more computer-readable memory devices of claim 8 comprising additional processor-executable instructions that, responsive to execution by the processor, implement the network manager to cause the wireless interface to transmit, prior to reconfiguring the wireless interface to communicate via the first wireless network, a fourth data packet via the second wireless network effective to prevent the peer device from transmitting additional data packets during the second duration of time.

10. The one or more computer-readable memory devices of claim 9 comprising additional processor-executable instructions that, responsive to execution by the processor, implement the network manager to align the second duration of time with a scheduled beacon transmission of the first wireless network.

11. The one or more computer-readable memory devices of claim 8, wherein the first duration of time is not equal to the second duration of time.

12. The one or more computer-readable memory devices of claim 8 comprising additional processor-executable instructions that, responsive to execution by the processor, implement the network manager to:

determine, upon receiving a data packet via the first wireless network, that the second device will not transmit additional data packets during the second duration of time; and reconfigure the wireless interface of the first device to the second mode for communication via the second wireless network to enable communication with the peer device during a remainder of the second duration of time.

13. The one or more computer-readable memory devices of claim 8 comprising additional processor-executable instructions that, responsive to execution by the processor, implement the network manager to cause the wireless interface to transmit, subsequent to reconfiguring the wireless interface to the first mode for communication via the first wireless network, a fourth data packet via the first wireless network effective to cause the second device to transmit the data packets to the first device during the second duration of time.

14. The one or more computer-readable memory devices of claim 8 comprising additional processor-executable instructions that, responsive to execution by the processor, implement the network manager to modify, based on a transactional latency associated with the first wireless network, the second duration of time.

15. A system comprising:
a wireless interface configurable to a first mode for communicating data over an infrastructure network or to a second mode for communicating data over a peer-to-peer network; and
a network manager configured to:
transmit, via the wireless interface in the first mode, a first packet effective to prevent a device associated with the infrastructure network from attempting to transmit data packets to the system,
reconfigure the wireless interface of the system to the second mode for communication via the peer-to-peer network for a first duration of time,
transmit, via the wireless interface, a second packet effective to cause a peer device associated with the peer-to-peer network to transmit data packets to the system during the first duration of time, and
reconfigure, responsive to the first duration of time ending, the wireless interface to the first mode for communication via the infrastructure network for a second duration of time effective to enable the system to receive the data packets that were previously prevented from being transmitted from the device to the system.

16. The system of claim 15, wherein the second packet includes information that enables the peer device to join the peer-to-peer network or to synchronize communications with the peer-to-peer network.

17. The system of claim 15, wherein the network manager is further configured to, responsive to determining that the data packets will not be transmitted by the device during the second duration of time, reconfigure the wireless interface of the system to the second mode for communication via the peer-to-peer network for a remainder of the second duration of time.

18. The system of claim 15, wherein the wireless interface comprises a wireless local-area-network (WLAN) interface or a wireless personal-area-network (WPAN) interface.

19. The system of claim 15, wherein the wireless interface comprises a single physical layer (PHY) interface and a single media access control layer (MAC) interface, and reconfiguring the wireless interface to the first or second mode for communication via the first or the second wireless network, respectively is effective to time-share the wireless interface between the first and the second wireless network.

20. The system of claim 15, wherein the system is embodied as a System-on-Chip.

* * * * *